(12) United States Patent
Sivaraj et al.

(10) Patent No.: US 12,182,965 B2
(45) Date of Patent: Dec. 31, 2024

(54) CONDITIONAL AXIAL TRANSFORMER LAYERS FOR HIGH-FIDELITY IMAGE TRANSFORMATION

(71) Applicant: Google LLC, Mountain View, CA (US)

(72) Inventors: Manoj Kumar Sivaraj, Amsterdam (NL); Dirk Weissenborn, Berlin (DE); Nal Emmerich Kalchbrenner, Amsterdam (NL)

(73) Assignee: Google LLC, Mountain View, CA (US)

( * ) Notice: Subject to any disclaimer, the term of this patent is extended or adjusted under 35 U.S.C. 154(b) by 469 days.

(21) Appl. No.: 17/449,162

(22) Filed: Sep. 28, 2021

(65) Prior Publication Data
US 2022/0108423 A1 Apr. 7, 2022

Related U.S. Application Data

(60) Provisional application No. 63/086,945, filed on Oct. 2, 2020.

(51) Int. Cl.
*G06T 3/4046* (2024.01)
*G06N 3/08* (2023.01)
*G06T 3/4023* (2024.01)

(52) U.S. Cl.
CPC ............. *G06T 3/4046* (2013.01); *G06N 3/08* (2013.01); *G06T 3/4023* (2013.01)

(58) Field of Classification Search
None
See application file for complete search history.

(56) References Cited

U.S. PATENT DOCUMENTS 6,775,418 B1 * 8/2004 Yamauchi ................ G06T 5/30
345/611
11,494,616 B2 * 11/2022 Guo ...................... G06N 3/045
(Continued)

FOREIGN PATENT DOCUMENTS

CN 109859106 A * 6/2019
CN 111259773 A * 6/2020

OTHER PUBLICATIONS

Parmar, N., Vaswani, A., Uszkoreit, J., Kaiser, L., Shazeer, N., Ku, A., & Tran, D. (Jul. 2018). Image transformer. In International conference on machine learning (pp. 4055-4064). PMLR. (Year: 2018).*

(Continued)

*Primary Examiner* — Amandeep Saini
*Assistant Examiner* — Caroline Tabancay Duffy
(74) *Attorney, Agent, or Firm* — McDonnell Boehnen Hulbert & Berghoff LLP

(57) ABSTRACT

Apparatus and methods relate to receiving an input image comprising an array of pixels, wherein the input image is associated with a first characteristic; applying a neural network to transform the input image to an output image associated with a second characteristic by generating, by an encoder and for each pixel of the array of pixels of the input image, an encoded pixel, providing, to a decoder, the array of encoded pixels, applying, by the decoder, axial attention to decode a given pixel, wherein the axial attention comprises a row attention or a column attention applied to one or more previously decoded pixels in rows or columns preceding a row or column associated with the given pixel, wherein the row or column attention mixes information within a respective row or column, and maintains independence between respective different rows or different col-
(Continued)

umns; and generating, by the neural network, the output image.

**20 Claims, 16 Drawing Sheets
(10 of 16 Drawing Sheet(s) Filed in Color)**

(56) References Cited

U.S. PATENT DOCUMENTS

| | | | |
|---|---|---|---|
| 2019/0130213 A1 | 5/2019 | Shazeer | |
| 2019/0138838 A1* | 5/2019 | Liu | G06V 10/764 |
| 2019/0279402 A1* | 9/2019 | Panetta | G06T 7/10 |
| 2020/0098144 A1 | 3/2020 | Norouzi | |
| 2020/0104978 A1 | 4/2020 | Kalchbrenner | |
| 2020/0250528 A1* | 8/2020 | van den Oord | G06N 3/08 |
| 2020/0364910 A1* | 11/2020 | Price | G06T 7/40 |

OTHER PUBLICATIONS

Reed, S., Oord, A., Kalchbrenner, N., Colmenarejo, S. G., Wang, Z., Chen, Y., . . . & Freitas, N. (Jul. 2017). Parallel multiscale autoregressive density estimation. In International conference on machine learning (pp. 2912-2921). PMLR. (Year: 2017).*

Menick, J., & Kalchbrenner, N. (2018). Generating high fidelity images with subscale pixel networks and multidimensional upscaling. arXiv preprint arXiv:1812.01608. (Year: 2018).*

Cheng, Z., Yang, Q., & Sheng, B. (2015). Deep Colorization. 2015 IEEE International Conference on Computer Vision (ICCV), 415-423. https://doi.org/10.1109/ICCV.2015.55 (Year: 2015).*

Xu, X., & Li, X. (2019). SCAN: Spatial Color Attention Networks for Real Single Image Super-Resolution. 2019 IEEE/CVF Conference on Computer Vision and Pattern Recognition Workshops (CVPRW), 2024-2032. https://doi.org/10.1109/CVPRW.2019.00254 (Year: 2019).*

Ho et al., "Axial Attention in Multidimensional Transformers", arXiv:1912.12180v1 [cs.CV] Dec. 20, 2019.

"Colorization Transformer", submitted as a conference paper at ICLR 2021.

Saharia et al., "Palette: Image-to-Image Diffusion Models," arXiv:2111.05826v2, ACM SIGGRAPH, Aug. 8-11, 2022, 29 pages.

Menick et al., "Generating High Fidelity Images with Subscale Pixel Networks and Multidimensional Upscaling", arXiv.1812.01608v1 [cs.CV] Dec. 4, 2018.

* cited by examiner

⬐1400

1410 Receiving, via a computing device, an input image comprising an array of pixels, wherein the input image is associated with a first characteristic

1420 Applying a neural network to transform the input image associated with the first characteristic to an output image associated with a second characteristic, wherein the applying of the neural network includes:

Generating, by an encoder of the neural network and for each pixel of the array of pixels of the input image, an encoded pixel Providing, to a decoder of the neural network, the array of encoded pixels Applying, by the decoder, axial attention to decode a given pixel, wherein the axial attention comprises a row attention or a column attention applied to one or more previously decoded pixels in rows or columns preceding a row or column associated with the given pixel, and wherein the row or column attention mixes information within a respective row or column, and maintains independence between respective different rows or different columns

1430 Generating, by the neural network, the output image associated with the second characteristic

FIG. 14

CONDITIONAL AXIAL TRANSFORMER LAYERS FOR HIGH-FIDELITY IMAGE TRANSFORMATION

CROSS-REFERENCE TO RELATED APPLICATIONS/INCORPORATION BY REFERENCE

This application claims priority to U.S. Provisional Patent Application No. 63/086,945, filed on Oct. 2, 2020, which is hereby incorporated by reference in its entirety.

BACKGROUND

Autoregressive models are a family of exact likelihood-based generative models that represent a joint representation of data. Neural network models in this family have achieved state-of-the-art log likelihoods on high-dimensional image and video datasets. Autoregressive model architectures that can read long-range dependencies over large receptive fields are able to express all joint distributions over the data. Self-attention is a building block for autoregressive model architectures, but self-attention comes at the price of computational complexity. The memory and computation consumed by self-attention grows quadratically with the sequence length N, making it expensive to directly apply self-attention to long sequences.

SUMMARY

In one aspect, a computer-implemented method is provided. The method involves receiving, via a computing device, an input image comprising an array of pixels, wherein the input image is associated with a first characteristic. The method also involves applying a neural network to transform the input image associated with the first characteristic to an output image associated with a second characteristic, wherein the applying of the neural network involves generating, by an encoder of the neural network and for each pixel of the array of pixels of the input image, an encoded pixel, providing, to a decoder of the neural network, the array of encoded pixels, applying, by the decoder, axial attention to decode a given pixel, wherein the axial attention comprises a row attention or a column attention applied to one or more previously decoded pixels in rows or columns preceding a row or column associated with the given pixel, and wherein the row or column attention mixes information within a respective row or column, and maintains independence between respective different rows or different columns. The method further involves generating, by the neural network, the output image associated with the second characteristic.

In another aspect, a computing device is provided. The computing device includes one or more processors and data storage. The data storage has stored thereon computer-executable instructions that, when executed by one or more processors, cause the computing device to carry out functions. The functions include: receiving an input image comprising an array of pixels, wherein the input image is associated with a first characteristic; applying a neural network to transform the input image associated with the first characteristic to an output image associated with a second characteristic, wherein the applying of the neural network involves generating, by an encoder of the neural network and for each pixel of the array of pixels of the input image, an encoded pixel, providing, to a decoder of the neural network, the array of encoded pixels, applying, by the decoder, axial attention to decode a given pixel, wherein the axial attention comprises a row attention or a column attention applied to one or more previously decoded pixels in rows or columns preceding a row or column associated with the given pixel, and wherein the row or column attention mixes information within a respective row or column, and maintains independence between respective different rows or different columns; and generating, by the neural network, the output image associated with the second characteristic.

In another aspect, a computer program is provided. The computer program includes instructions that, when executed by a computer, cause the computer to carry out functions. The functions include: receiving an input image comprising an array of pixels, wherein the input image is associated with a first characteristic; applying a neural network to transform the input image associated with the first characteristic to an output image associated with a second characteristic, wherein the applying of the neural network involves generating, by an encoder of the neural network and for each pixel of the array of pixels of the input image, an encoded pixel, providing, to a decoder of the neural network, the array of encoded pixels, applying, by the decoder, axial attention to decode a given pixel, wherein the axial attention comprises a row attention or a column attention applied to one or more previously decoded pixels in rows or columns preceding a row or column associated with the given pixel, and wherein the row or column attention mixes information within a respective row or column, and maintains independence between respective different rows or different columns; and generating, by the neural network, the output image associated with the second characteristic.

In another aspect, an article of manufacture is provided. The article of manufacture includes one or more computer readable media having computer-readable instructions stored thereon that, when executed by one or more processors of a computing device, cause the computing device to carry out functions. The functions include: receiving an input image comprising an array of pixels, wherein the input image is associated with a first characteristic; applying a neural network to transform the input image associated with the first characteristic to an output image associated with a second characteristic, wherein the applying of the neural network involves generating, by an encoder of the neural network and for each pixel of the array of pixels of the input image, an encoded pixel, providing, to a decoder of the neural network, the array of encoded pixels, applying, by the decoder, axial attention to decode a given pixel, wherein the axial attention comprises a row attention or a column attention applied to one or more previously decoded pixels in rows or columns preceding a row or column associated with the given pixel, and wherein the row or column attention mixes information within a respective row or column, and maintains independence between respective different rows or different columns; and generating, by the neural network, the output image associated with the second characteristic.

In another aspect, a system is provided. The system includes means for receiving an input image comprising an array of pixels, wherein the input image is associated with a first characteristic; means for applying a neural network to transform the input image associated with the first characteristic to an output image associated with a second characteristic, wherein the applying of the neural network involves generating, by an encoder of the neural network and for each pixel of the array of pixels of the input image, an encoded pixel, providing, to a decoder of the neural network, the array of encoded pixels, applying, by the decoder, axial attention to decode a given pixel, wherein the axial attention comprises a row attention or a column attention applied to one or more previously decoded pixels in rows or columns preceding a row or column associated with the given pixel, and wherein the row or column attention mixes information within a respective row or column, and maintains independence between respective different rows or different columns; and means for generating, by the neural network, the output image associated with the second characteristic.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

The patent or application file contains at least one drawing executed in color. Copies of this patent or patent application publication with color drawings will be provided by the Office upon request and payment of the necessary fee.

FIG. 14 is a flowchart of a method, in accordance with example embodiments.

DETAILED DESCRIPTION

Figure 1:
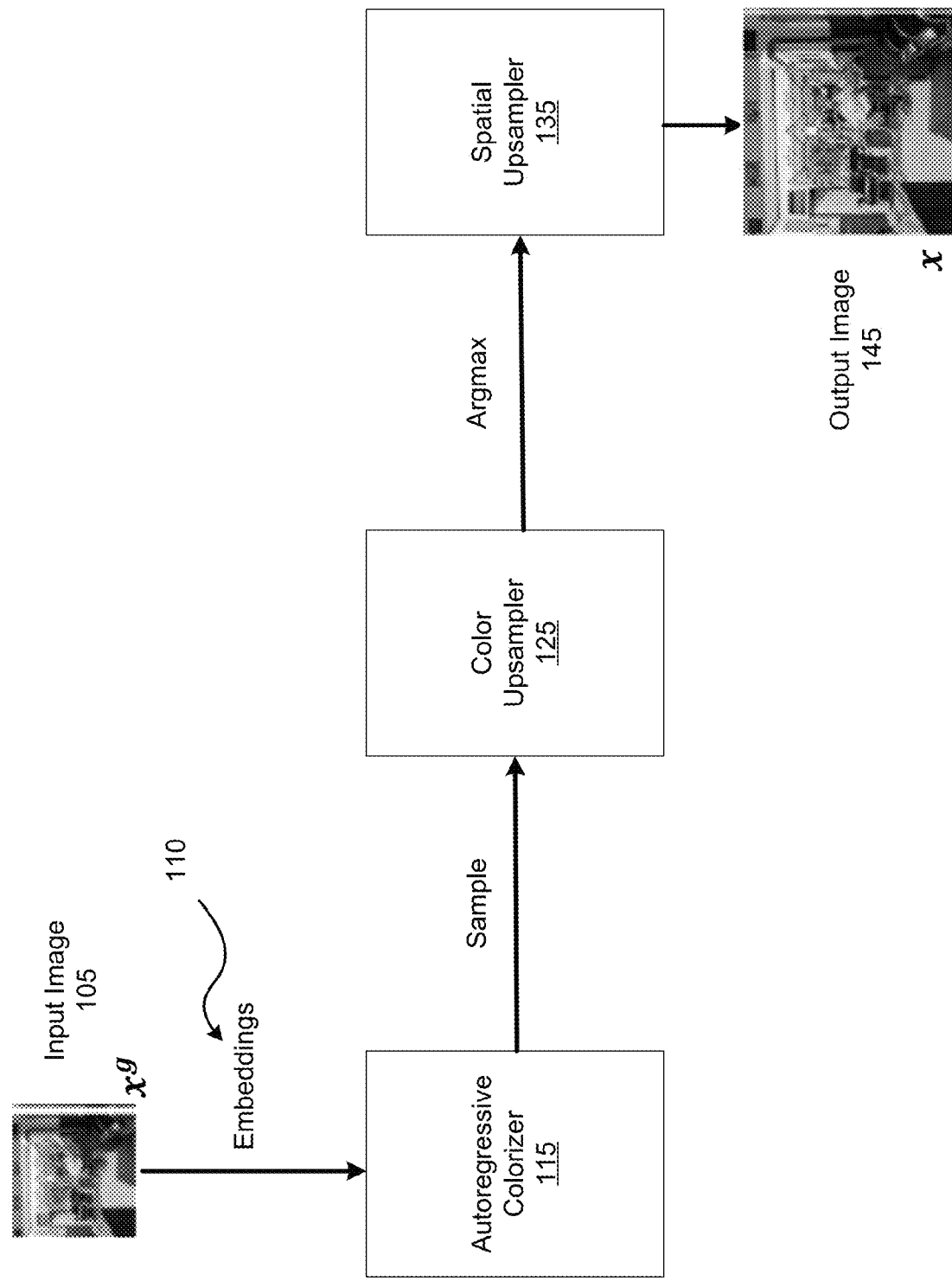
FIG. 1 illustrates an example block diagram illustrating a conditioned, axial self-attention based neural network, in accordance with example embodiments.

This application relates, in one aspect, to a conditioned, axial self-attention based neural network. In another aspect, this application relates to applying, using machine learning techniques, such as but not limited to neural network techniques, to transform an input image associated with a first characteristic to an output image associated with a second characteristic. For example, grayscale image may be transformed to one or more high fidelity colorizations of the grayscale image. Also, for example, an image of a low resolution may be transformed to an image of a high resolution. When a mobile computing device user takes an image, the resulting image may not always have a desired characteristic, such as colorization, resolution, and so forth. For example, the image may be a grayscale image or a low resolution image, or may have color depth and/or intensity that may need to be modified. Further, even if the image does have a desired colorization at one time, the user might want to change the colorization at a later time. As such, an image-processing-related technical problem arises that involves adjusting colorization of an already-obtained image.

Image colorization can be a challenging, inherently stochastic task that may be based on a semantic understanding of the scene as well as knowledge of the world. Core immediate applications of the technique include producing organic new colorizations of existing image and video content as well as giving life to originally grayscale media, such as old archival images, videos, and black-and-white cartoons. Colorization also has technical uses as a way to learn meaningful representations without explicit supervision, or as an unsupervised data augmentation technique, whereby diverse semantics-preserving colorizations of labelled images may be generated with a colorization model trained on a potentially much larger set of unlabeled images.

Some automated colorization techniques may be based on neural generative approaches based on log-likelihood estimation. Probabilistic models may also be used for a one-to-many task of image colorization. Such approaches may lead to better results than previously applied deterministic approaches. Probabilistic models may also be better adapted to producing multiple diverse colorings that may be sampled from a learned distribution.

Colorization methods have generally relied on human-in-the-loop approaches to provide hints in the form of scribbles, and exemplar-based techniques that involve identifying a reference source image to copy colors from. Exemplar based techniques may be extended to videos. Among automated, neural colorization methods, a deterministic family of approaches may involve variations of convolutional neural networks (CNNs) to model per-pixel color information conditioned on the intensity.

Probabilistic approaches generally extend unconditional image generation models such as Variational Autoencoders (VAEs), Generative Adversarial Networks (GANs), and normalizing flows, to incorporate conditioning information from a grayscale image. Some autoregressive approaches such as Pixel Recursive Colorization (PixColor) and PIC with PixColor may provide slightly better results than PIC due to their CNN-based upsampling strategy.

As described herein, an Axial Transformer is provided, which is a self-attention-based autoregressive model for images and other data organized as high dimensional tensors. Existing autoregressive models may utilize large computational resources for high dimensional data, or may decrease resource requirements by making quality-based choices in terms of distribution expressiveness or ease of implementation. The architecture described herein, by contrast, maintains both full expressiveness over joint distributions over data, and ease of implementation with standard deep learning frameworks. This may be achieved with reasonable memory and computation resources, and such efficacy may be demonstrated with state-of-the-art results on standard generative modeling benchmarks. The models described herein are based on axial attention, a type of self-attention that naturally aligns with the multiple dimensions of the tensors in both the encoding and the decoding settings. Notably the proposed structure of the layers allows for the vast majority of the context to be computed in parallel during decoding without introducing any independence assumptions. This semi-parallel structure enables decoding from a very large Axial Transformer broadly applicable.

A neural network such as Colorization Transformer (ColTran) may be trained in a completely unsupervised manner. ColTran relies on the Axial Transformer and can model interactions between pixels with two layers, thereby not requiring a large depth. Some technologies use different architectures for conditioning, colorization, and super-resolution. By contrast, ColTran has a conceptually simpler architecture because of self-attention blocks that are used for both colorization and superresolution. The multi-stage generation process in ColTran can upsample in depth and in size based on fully parallel networks. Although example embodiments may be described in terms of transforming a grayscale image to a colorized version of the grayscale image, similar techniques may be applied to transform other image characteristics, such as, for example, an image resolution, a color depth and/or a color intensity.

Network Model

Image colorization is a task of transforming an input image associated with a first characteristic (e.g., a grayscale image) $x^g \in \mathbb{R}^{H \times W \times 1}$ into an output image associated with a second characteristic (e.g., a colored image) $x \in \mathbb{R}^{H \times W \times 3}$. Such a task may be inherently stochastic; for a given image $x^g$ (e.g., a grayscale image), there exists a conditional distribution over x denoted as $p(x|x^g)$. In some embodiments, instead of generating x directly from $x^g$, two intermediate low resolution images $x^{s\downarrow}$ and $x^{s\downarrow c\downarrow}$ with different color depth may be sequentially predicted first. Besides simplifying the individual tasks, the smaller resolution may enable training of larger models.

FIG. 1 illustrates an example block diagram illustrating a conditioned, axial self-attention based neural network, in accordance with example embodiments. In some embodiments, plausible and diverse colorizations may be generated. An input image $x^g$ 105 may be received, which includes an array of pixels, which may be represented as rows and columns. In some aspects, input image 105 may be a low resolution image or a grayscale image. Although a grayscale image is used herein for illustration purposes, the techniques disclosed herein may generally apply to enhancement of any digital object that may be represented by an array of high-dimensional vectors. A neural network may be applied to input image 105, wherein the applying of the neural network involves generating, by an encoder of the neural network and for each pixel of the array of pixels of input image 105, an encoded pixel. For example, one or more embeddings 110 of input image 105 may be generated. In some embodiments, the array of encoded pixels may be provided to a decoder of the neural network. In some embodiments, the decoder may apply axial attention to decode a given pixel. The axial attention may include a row attention or a column attention applied to one or more previously decoded pixels in rows or columns preceding a row or column associated with the given pixel. Generally, the term "axial attention" as used herein refers to a mixing of information within a row or a column, while maintaining independence between different rows or different columns.

For example, autoregressive colorizer 115 may model, conditioned on input image 105, a distribution over low resolution, coarse colored images. Images may be sampled and provided to color upsampler 125, a fully parallel self-attention based decoder for color super-resolution. Also, for example, spatial upsampler 135 may be a fully parallel self-attention based decoder for spatial super-resolution. In some embodiments, autoregressive colorizer, also referred to herein as ColTran core, may be an instantiation of an Axial Transformer with conditional self-attention layers, as described in greater detail below. Encoders and upsamplers may be stacked, row-wise or column-wise self-attention blocks. In some embodiments, an attention block may be residual and may be trained to perform operations such as conditional self-attention, conditional multilayer perceptron (MLP), and/or conditional layer norm. In some embodiments, the neural network includes a two layer, pointwise, feed-forward network after a self-attention layer. For example, a component of the transformer architecture may be a two layer pointwise feed-forward network after a self-attention layer.

In some embodiments, the applying of the axial attention involves predicting one or more of a global per-channel scale and a global per-channel shift. In such embodiments, one or more of the global per-channel scale or the global per-channel shift may be a learnable parameter. For example, layer normalization may be applied to globally scale and shift a given normalized input using learnable vectors.

As illustrated, a neural network such as ColTran may be a colorizing probabilistic model that is composed of an autoregressive generative core (ColTran core), such as autoregressive colorizer 115, and two fully parallel upsampler networks (ColTran upsamplers), such as color upsampler 125 and spatial upsampler 135. In some embodiments, one or more of the three networks may use suitably modified axial self-attention blocks, where a self-attention layer over rows may be followed by a self-attention layer over columns. To improve grayscale conditioning, ColTran may be configured to perform a conditioning scheme, whereby each self-attention block may be additionally conditioned by input image 105 by way of multiple components. In some embodiments, an output image 145 comprising a colorization of the array of pixels of input image 105 may be generated by the neural network.

Autoregressive models are a family of exact likelihood-based generative models that represent the joint distribution of data $x=(x_1, \ldots, x_N)$ as a product of conditionals $p_\theta(x) = \Pi_{i=1}^N p_\theta(x_i|x_{<i})$. In some embodiments, neural network models in this family can achieve state-of-the-art log likelihoods on high-dimensional image and video datasets. This may be in part due to architectural innovations that enable large, high information bandwidth receptive fields for each pixel $x_i$, capable of expressing long-range dependencies over previous pixels $x_{<i}$, and computationally efficient, vectorizable computation of the log likelihood and its gradient.

Autoregressive model architectures that can read long-range dependencies over large receptive fields may be able to express joint distributions over the data. Meanwhile, architectures that admit fast log likelihood gradient computation may be suitable for training using a stochastic gradient method on a maximum likelihood objective, which is a stable training procedure for generative models.

Self-attention is a building block for autoregressive model architectures. The term "self-attention," as used herein, describes a neural network operation that is able to transform a sequence $y_1, \ldots, y_N$ into a sequence $y'_1, \ldots, y'_N$, where each $y'_i$ depends on $y_i$ by way of a single vectorizable computation. Generally, self-attention may be effective at learning long-range dependencies between data dimensions and neural networks that incorporate self-attention in their designs.

Intermediate Representations

In some embodiments, the applying of the axial attention involves applying, to each layer of a decoder, one or more convolutions to generate a plurality of affine transformations. Such embodiments also involve applying the plurality of affine transformations to key, query, and values. For example, a self-attention layer may take as input a length N sequence of D-dimensional embeddings X, which may be represented as a N×D matrix, and generate an output sequence Y, which may also be represented as a N×D matrix. These operations may be performed as follows:

$$Q = XW_Q, K = XW_K, V = XW_V, \tag{Eqn. 1}$$

$$A = \text{softmax}\left(\frac{QK^T}{\sqrt{D}}\right), Y = AV \tag{Eqn. 2}$$

$W_Q$, $W_K$, and $W_V$ are D×D parameter matrices that project the entries of the sequence X into queries, keys, and values, respectively. Each entry of the output sequence Y is a linear combination of values in V weighted by the attention matrix A. In some aspects, attention matrix A may be computed from similarities between all pairs of query and key vectors.

Both the expressive power and the resource cost of self-attention generally comes from computing A and Y. For example, it may take $O(N^2)$ time and space to compute pairwise similarities between Q and K, and to compute the linear combination of V vectors. Generally, such quadratic complexity may make it computationally intensive to apply self-attention to images and videos directly as flattened vectors. For example, a small 32×32×33 image has 3072 dimensions. Sequences such as these may be too long for self-attention, so self-attention may be scaled to these modalities. For example, these sequence lengths may be restricted in a modality-aware manner while attempting to preserve modeling performance.

One approach may be to restrict the conditioning context $x_{<i}$ to a carefully designed small subset of the data dimensions. While such an approach may reduce the cost of attention, which is performed over these small subsets instead of the full data, the model may not be able to express all joint distributions over the data. Some proposed image models restrict the conditioning context $x_{<i}$ to a small window of the full image, but such implementations may require redundant data copies to extract and process these small windows. Also, for example, video autoregressive models may be scaled by restricting the conditioning context $x_{<i}$, again preventing such models from expressing all joint distributions over pixels. The models described herein do not restrict context, and hence better log likelihoods may be obtained.

Another approach may be to stack multiple sparse attention layers, each with restricted context for computational efficiency, but in a manner that overlapping these layers yields a full-context model. However, such architectures generally appear to require custom sparse attention Graphics Processing Unit (GPU) kernels to implement a specific block-sparse variant of a matrix-matrix-multiply operation. The models are generally not amenable to be easily implemented on other hardware such as, for example, Tensor Processing Units (TPUs).

As described herein, attention-based autoregressive models can be designed to resolve the challenges described above. For example, an Axial Transformer may be configured with a full conditioning context, so its ability to express joint distributions is not limited. The Axial Transformer also does not require any redundant data copies or custom kernels to implement in an efficient way.

Axial Transformer

Generally, an Axial Transformer described herein may be a simple, yet effective self-attention-based autoregressive model for data organized as multidimensional tensors. Rather than applying attention to a flattened string of tensor elements, the model described herein applies attention along a single axis of the tensor without flattening. This operation is referred to herein as axial attention. Since the length of any single axis (that is, the height or width of an image) is typically much smaller than the total number of elements, an axial attention operation may result in significant savings in computation and memory over standard self-attention.

The Axial Transformer architecture described allows for a majority of the conditioning context $x_{<i}$ to be embedded with a high degree of parallelism without introducing conditional independence assumptions among any of the locations, and is also amenable to a simple-to-implement fast sampling procedure. To sample one row of an image, the Axial Transformer runs an autoregressive Transformer over that one row only, without re-embedding pixels from previous rows. In some embodiments, the Axial Transformer may be configured so that it defines fully expressive joint distribution. Accordingly, dependencies on previous pixels are not lost.

As described herein, one or more intermediate representations may be generated. For example, a spatially downsampled representation $x^{s\downarrow}$ of x may be generated by performing area interpolation. In this description, a down arrow ↓ denotes downsampling, whereas an up arrow ↑ denotes upsampling. Also, for example, the letter "c" denotes color, "s" denotes resolution, "g" denotes ground truth or input. Also, for example a 3 bit per-channel representation $x^{s\downarrow c\downarrow}$ of $x^{s\downarrow}$ may be generated. For example, each color channel has 8 intensities. Thus, there are $8^3=512$ coarse colors per pixel which may be predicted directly as a single "color" channel. In some embodiments, the conditional distribution over x, or conditional likelihood, denoted as $p(x|x^g)$, to incorporate intermediate representations may be represented as:

$$p(x \mid x^g) = p(x \mid x^g) \cdot 1 = \tag{Eqn. 3}$$
$$p(x \mid x^g) \cdot p(x^{s\downarrow c\downarrow}, x^{s\downarrow} \mid x, x^g) = p(x^{s\downarrow c\downarrow}, x^{s\downarrow}, x \mid x^g)$$

$$= p(x \mid x^{s\downarrow}, x^g) \cdot p(x^{s\downarrow} \mid x^{s\downarrow c\downarrow}, x^g) \cdot p(x^{s\downarrow c\downarrow} \mid x^g) \tag{Eqn. 4}$$

In some aspects, autoregressive colorizer 115 can be a conditional, auto-regressive axial transformer. In some embodiments, autoregressive colorizer 115 can be configured to model an intermediate distribution $p_c(x^{s\downarrow c\downarrow})$ over 512 coarse colors for each pixel, conditioned on colors from previously predicted pixels as per raster order in Eqn. 5 below. Also, for example, a parallel prediction head $\tilde{p}_c(x^{s\downarrow c\downarrow})$ may be trained which may facilitate regularization, as described in Eqn. 6 below:

$$p_C(x^{s\downarrow c\downarrow} \mid x^g) = \prod_{i=1}^{M} \prod_{j=1}^{N} p_C(x_{ij}^{s\downarrow c\downarrow} \mid x^g, x_{<i}^{s\downarrow c\downarrow}, x_{i,<j}^{s\downarrow c\downarrow}) \quad \text{(Eqn. 5)}$$

$$\tilde{p}_C(x^{s\downarrow c\downarrow} \mid x^g) = \prod_{i=1}^{M} \prod_{j=1}^{N} \tilde{p}_C(x_{ij}^{s\downarrow c\downarrow} \mid x^g) \quad \text{(Eqn. 6)}$$

where the symbol "<i" denotes one or more elements in a row or column preceding the ith row or column, respectively. In some embodiments, alternating blocks of axial self-attention for upsampling color, $f_{c\uparrow}$, and for upsampling resolution, $f_{s\uparrow}$, respectively, for all pixels in parallel. For example, $f_{c\uparrow}$ may be applied to upsample a coarse image $x^{s\downarrow c\downarrow}$ conditioned on input image $x^g$ into a per-pixel, per-channel distribution over 256 color intensities as described in Eqn. 7 below. Also, for example, $f_{s\uparrow}$ may spatially upsample $x^{s\downarrow}$ to x, as described in Eqn. 8 below:

$$\hat{p}_{c\uparrow}(x^{s\downarrow} \mid x^g) = \prod_{i=1}^{M} \prod_{j=1}^{N} \tilde{p}_{c\uparrow}(x_{ij}^{s\downarrow c\downarrow} \mid x^g, x^{s\downarrow c\downarrow}) \quad \text{(Eqn. 7)}$$

$$\hat{p}_{s\uparrow}(x \mid x^g) = \prod_{i=1}^{M} \prod_{j=1}^{N} \tilde{p}_{s\uparrow}(x_{ij} \mid x^g, x^{s\downarrow}) \quad \text{(Eqn. 8)}$$

Axial Attention

The approach described herein does not change the original shape of the multidimensional data tensor, and performs a masked or unmasked attention over a single axis of the tensor at a time. As previously mentioned, such an operation may be termed axial attention, and denoted by $\text{Attention}_k(x)$. Attention may be performed over axis k of the tensor x (e.g., an input image comprising an array of pixels), mixing information along axis k while keeping information along other axes independent. In some embodiments, axial attention over axis k by transposing all axes except k to the batch axis, calling standard attention as a subroutine, and subsequently undoing the transpose. An alternative approach may be to use an "einsum" operation available in deep learning libraries.

When the data is an image, $\text{Attention}_1$ may be termed column attention, as it mixes information within columns while keeping separate columns independent. Also, for example, $\text{Attention}_2$ may be termed row attention, as it mixes information within rows while keeping separate rows independent. Axial attention on a square image of size $N = S \times S$ may perform attention on S sequences of length S. Accordingly, a total of $O(S \cdot S^2) = O(N \sqrt{N})$ computations are performed. This may result in a savings of order $O(\sqrt{N})$ over standard self-attention. In general, for a d-dimensional tensor with $N = S^d$, axial attention may result in savings of an order $N^{(d-1)/d}$ computation over standard attention. A single layer of axial attention along some axis k may not have a full receptive field since it covers a single axis; however, stacking two axial attention layers allows the model to obtain a global receptive field.

Masked Attention

As described herein, Masked Attention, denoted $\text{MaskedAttention}_k$, can be a causally masked variant of $\text{Attention}_k(x)$. For example, component i of the result of $\text{MaskedAttention}_k(x)$ along axis k may depend only on components $1, \ldots, i$ of x along axis k. The receptive fields of these attention patterns, both unmasked and masked, are illustrated in FIG. 2 Such masked blocks are utilized in the autoregressive model described in FIG. 1.

Figure 2:
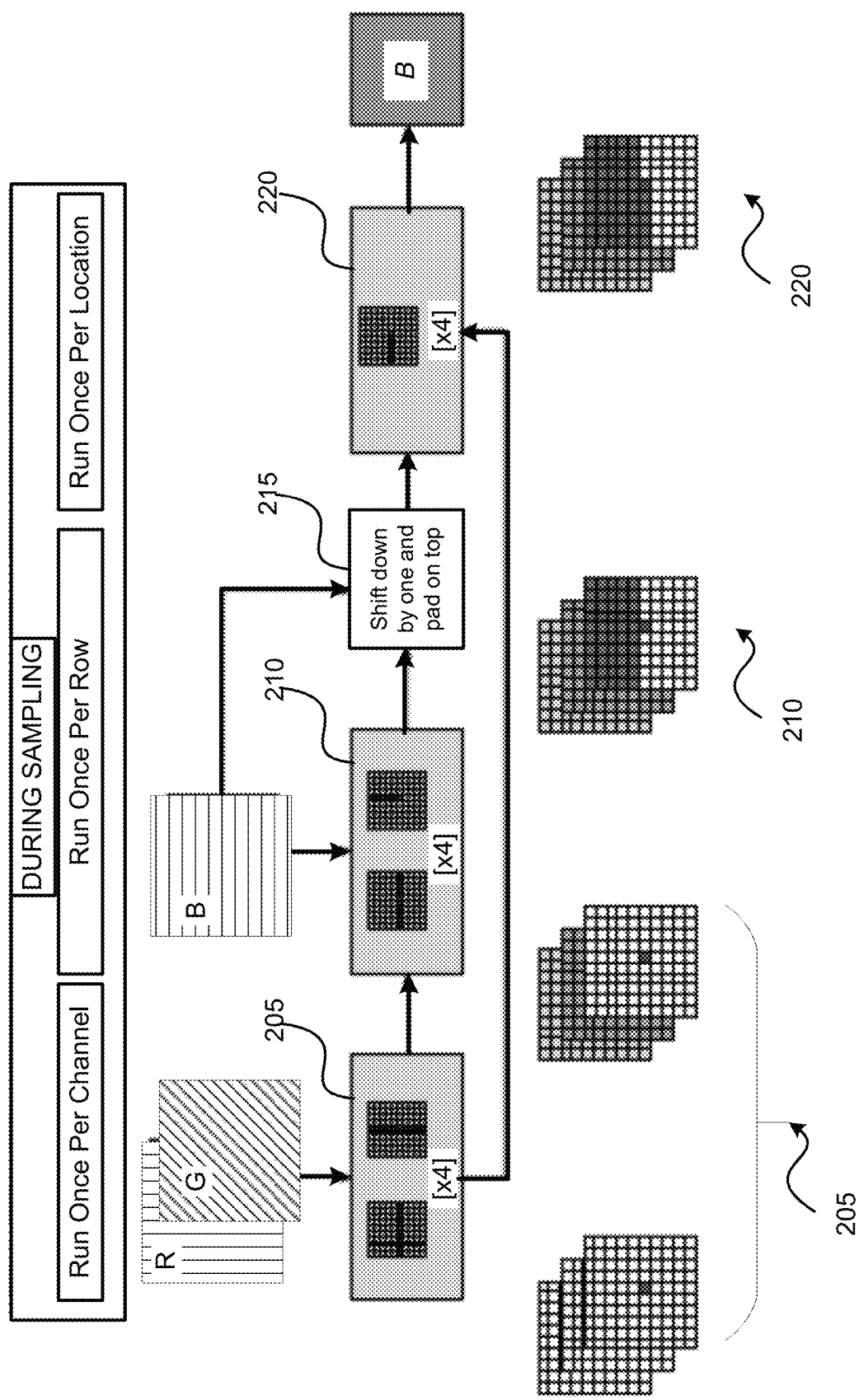
FIG. 2 is a diagram illustrating an example axial transformer for a multi-dimensional feature vector, in accordance with example embodiments.

FIG. 2 is a diagram illustrating an example axial transformer for a multi-dimensional feature vector, in accordance with example embodiments. For example, an axial transformer model for 2-dimensional tensors is shown. Before sampling a channel, preceding channels and frames may be encoded with 8 blocks of unmasked row and unmasked column attention, as shown at 205. Then, for each row, 4 blocks of unmasked row (i.e. full row) and masked column (i.e., partial column) attention may be applied to integrate the previously sampled rows for the active channels into the encoded representations, as shown at 210. Finally, the encoded representation may be shifted up, as shown at 215, so that the conditioning information satisfies causality, and then an inner decoder consisting of 4 blocks of masked row attention may be run to sample a new row in the image, as shown at 220.

Axial attention can be used within standard Transformer layers to pro-duce Axial Transformer layers. The basic building blocks may share one or more aspects with those found in a standard Transformer architecture, such as, for example, layer normalization, $\text{LayerNorm}(x)$, and a dense layer operating over a last axis of input, x, denoted $\text{Dense}_D(x)$. The letter D denotes a dimension of output activations. If the input has shape $H \times W \times C$, then this operation is identical to a 1×1 convolution, and the output has shape $H \times W \times D$. In some aspects, ResNet axial attention blocks operating on tensors of D-dimensional embeddings may be defined as follows:

$$\text{FeedForwardBlock}(x) = x + \text{Dense}_D(\text{Nonlinearity}(\text{Dense}_{D'}(\text{LayerNorm}(x)))) \quad \text{(Eqn. 9)}$$

$$\text{AttentionBlock}_k(x) = x + \text{Dense}_D(\text{Attention}_k(\text{LayerNorm}(x))) \quad \text{(Eqn. 10)}$$

$$\text{TransformerBlock}_k(x) = \text{FeedForwardBlock}(\text{AttentionBlock}_k(x)) \quad \text{(Eqn. 11)}$$

where D' may be selected as a constant factor larger than D, from 1 to 4. In some embodiments, a $\text{MaskedTransformerBlock}_k(x)$ may be defined by substituting $\text{MaskedAttention}_k$ for $\text{Attention}_k$ in Eqns. 7-9. Although unmasked axial attention is used in some approaches, the neural networks described herein use autoregressive image modeling based on masked axial attention.

Figure 3:
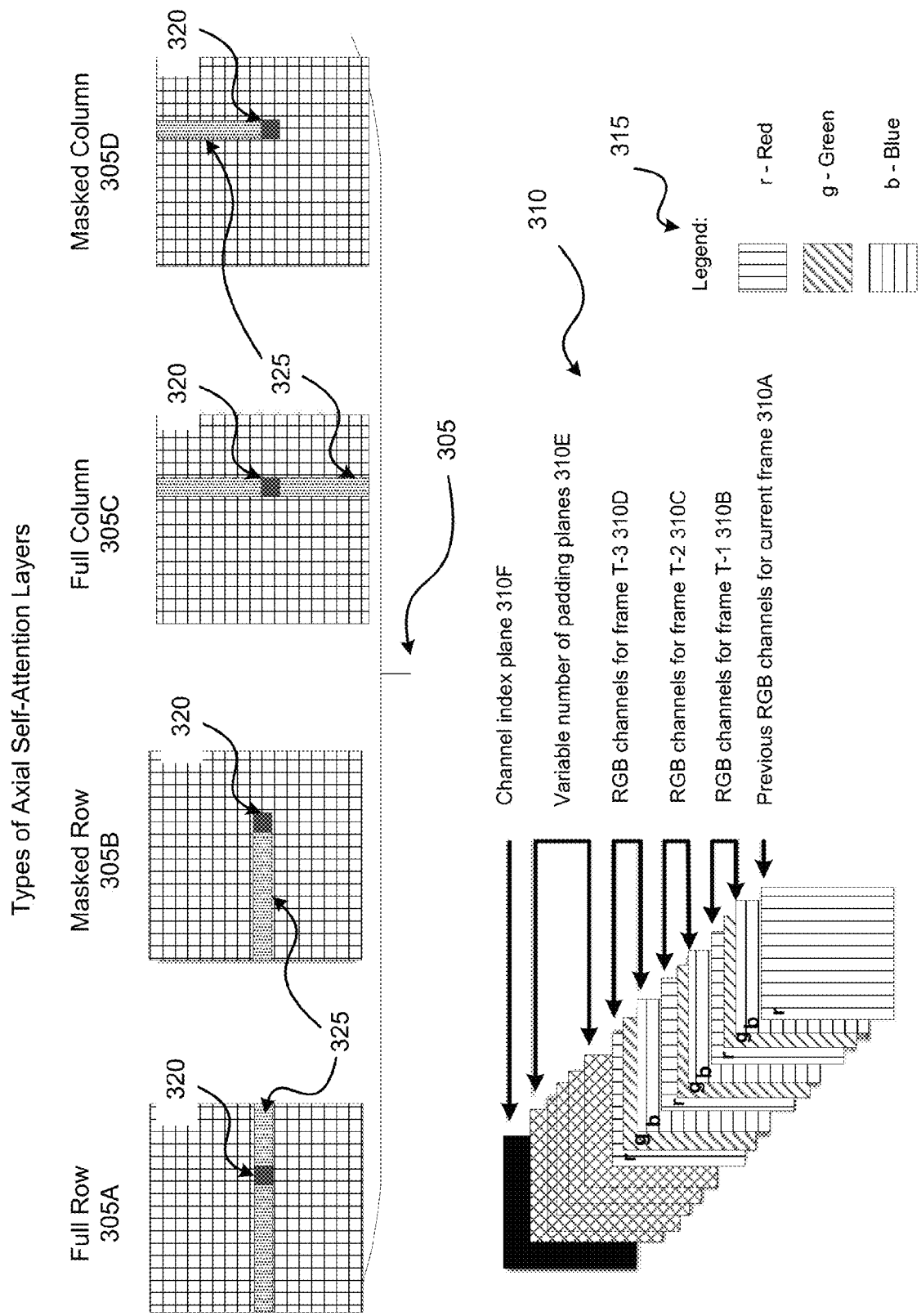
FIG. 3 is a diagram illustrating example masking operations applied to a multi-dimensional feature vector, in accordance with example embodiments.

FIG. 3 is a diagram illustrating example masking operations applied to a multi-dimensional feature vector, in accordance with example embodiments. FIG. 3 illustrates types of axial attention layers 305 that are the building blocks of the axial transformer of FIG. 1. Full row 305A is associated with a given active pixel 320, where the receptive field 325 is an entire row of pixels. Masked row 305B is associated with a given active pixel 320, where the receptive field 325 is a partial row of pixels that precede the active pixel 320. Full column 305C is associated with a given active pixel 320, where the receptive field 325 is an entire column of pixels. Masked column 305D is associated with a given active pixel 320, where the receptive field 325 is a partial column of pixels that precede the active pixel 320. The shaded locations correspond to the receptive field of the output location, also referred to herein as a given pixel, or active pixel 320.

Also illustrated at frames 310 is an arrangement of inputs to the encoding network of the Axial Transformer. Previously available or generated channels of an image or video may be sequentially stacked in the input. For example, frame 310A represents previous RGB channels for a current frame. RGB channels for frames at time T-1 are represented by frames 310B. RGB channels for frames at time T-2 are represented by frames 310C. RGB channels for frame at time T-3 are represented by frames 310D. A variable number of padding planes 310E may be used as placeholders for future generated channels. A final integer plane 310F may signal to the Axial Transformer the channel that is being generated at that step. A legend 315 is provided to reference the respective colors for the RGB frames.

Figure 4A:
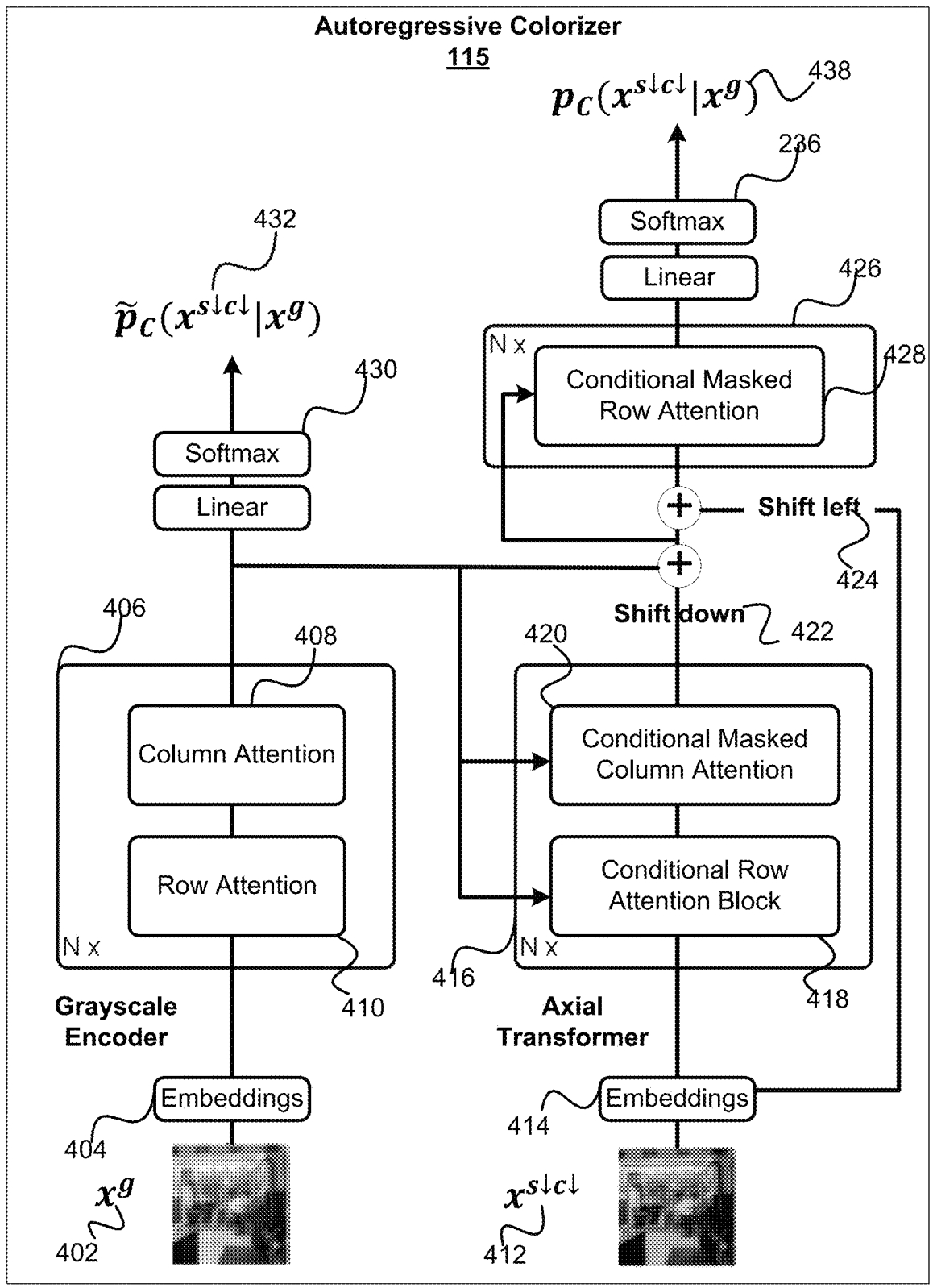
FIG. 4A illustrates an example autoregressive colorizer, in accordance with example embodiments.

FIG. 4A illustrates an example autoregressive colorizer 115, in accordance with example embodiments. In some embodiments, input image 402 may be received, and one or more embeddings 404 may be generated by an encoder (e.g., a grayscale encoder). In some embodiments, first encoder 406 may represent a layer of column attention 408 and row attention 410. In some embodiments, the neural network may include a plurality of alternating row-wise and column-wise self-attention layers. For example, first encoder 406 may comprise multiple layers, such as N layers. First softmax operation 430 may be applied to outputs from first encoder 406 to generate an intermediate conditional distribution 432 represented as $\tilde{p}_c(x^{s\downarrow c\downarrow}|x^g)$.

In some embodiments, the neural network includes an autoregressive colorizer comprising an encoder (e.g., a grayscale encoder) configured to apply alternating row and column attention, and an axial transformer configured to apply alternating conditional masked column attention and conditional row attention. For example, intermediate image $x^{s\downarrow c\downarrow}$ 412 may be encoded to generate embeddings 414. Second encoder 416 may represent another layer of conditional row attention 418 and conditional masked column attention 420. In some embodiments, second encoder 416 may receive output of apply first encoder 406, and perform conditional row attention 418 and conditional masked column attention 420. In some embodiments, second encoder 416 may comprise multiple layers, such as N layers. A shift down operation 422 may be applied to an output of first encoder 406 and second encoder 416. This may be followed by a shift left operation 424, and the process may be recursively repeated on intermediate image 412.

In some embodiments, the autoregressive colorizer further comprises one or more layers to apply conditional masked row attention. For example, the outputs of shift down operation 422 and shift left operation 424 may be provided to third encoder 426. Third encoder 426 may represent a layer of conditional masked row attention 428. As with first encoder 406 and second encoder 416, third encoder 426 may comprise multiple layers, such as N layers. Another softmax operation 436 may be applied to outputs from third encoder 426 to generate another intermediate conditional distribution 438 represented as $p_c(x^{s\downarrow c\downarrow}|x^g)$.

The term "Axial Transformers" as used herein, generally refers to axial attention-based autoregressive models for images and videos. Axial attention operations described herein may be used as building blocks in a multi-layer autoregressive model of the form $p_\theta(x)=\Pi_{i=1}^{N}p_\theta(x_i|x_{<i})$ following a raster scan ordering of pixels. In some embodiments, an autoregressive model may be configured over rows, then each row may be conditioned on previous rows, followed by conditioning on previous channels and frames. Decomposing the model in this manner can result in a simple, fast, and partly parallel sampling procedure.

Model for Single-Channel Images

For a single-channel image x with shape H×W, with each pixel taking an integer value in [0,255] representing its intensity. Pixel intensities may be first embedded into a H×W×D tensor of D-dimensional embeddings, which may be denoted as h. The model may be trained to transform h into a H×W×256 tensor of logits suitable for classification or sampling. These logits may depend only on previous pixels in the input x along the raster scan ordering to ensure that the model defines a valid autoregressive model.

A. Inner Decoder—a Row-Wise Model

Some embodiments involve applying, by an inner decoder and conditioned on an array of encoded pixels and an array of decoded pixels, row-wise self-attention based on one of masked row attention or masked column attention. For example, a "row-wise" model may be generated by applying masked row attention layers:

$h \leftarrow \text{Embed}(x)$ $h \leftarrow \text{ShiftRight}(h)+\text{PositionEmbeddings}$ $h \leftarrow \text{MaskedTransformerBlock}_2(h) \times L_{row}$ (Eqn. 12)

Here, $L_{row}$ is the number of masked row attention blocks applied to h. PositionEmbeddings is a H×W×D tensor of position embeddings that inform the attention layers of the position. For parameter efficiency, "additively factorized" position embeddings may be used to parameterize them as a broadcasted sum of H×1×D embeddings for rows and 1×W×D embeddings for columns.

The operation ShiftRight shifts the input right by one pixel, which has the effect of shifting the receptive field left by one pixel. This ensures that the masked row attention layers exclude the current pixel from their receptive field, which allows the model architecture to define a correct autoregressive model.

As this model employs row attention only, it is computationally efficient. However, it may not define a full-context model because each location in the output may not depend on input pixels in previous rows. If the resulting h is used as logits for pixel intensity prediction, a set of H independent autoregressive models may be generated, such as $p(x_{i,j}|x_{i,1}, \ldots, x_{i,j-1})$ for each row $i \in [1,H]$, in lieu of a single autoregressive model with full context.

B. Outer Decoder—Capturing Rows Above

In some embodiments, the providing of the array involves providing the array to one or more self-attention layers of an outer decoder of the neural network. The applying of the axial attention may include applying, by the outer decoder a row-wise self-attention to the given pixel, where the row attention is an unmasked row attention, where the column attention is a masked column attention, and where the one or more previously decoded pixels are in rows preceding the row associated with the given pixel. In some embodiments, the applying of the axial attention may include applying, by the outer decoder a column-wise self-attention to the given pixel, where the row attention is a masked row attention, where the column attention is an unmasked column attention, and where the one or more previously decoded pixels are in columns preceding the column associated with the given pixel.

Some embodiments involve generating, by the outer decoder and conditioned on the array of encoded pixels, an array of decoded pixels. Such embodiments also involve providing, to one or more self-attention layers of an inner decoder of the neural network, the array of decoded pixels. The applying of the axial attention may include applying, by the inner decoder, a row-wise self-attention to the given pixel, where the row attention is a masked row attention, and where the one or more previously decoded pixels precede the given pixel in the row associated with the given pixel. In some embodiments, the applying of the axial attention may include applying, by the inner decoder, a column-wise self-attention to the given pixel, where the column attention is a masked column attention, and where the one or more previously decoded pixels precede the given pixel in the column associated with the given pixel.

For example, each pixel $x_{i,j}$ from above model depends on previous pixels in its own row $x_{i,<j}$. Accordingly, to generate an autoregressive model with full context, additional conditioning based on previous rows $x_{<j}$ may be added. In some embodiments, unmasked row and masked column layers may be inserted at the beginning of the model described in Eqn. 12 as follows:

$h \leftarrow \text{Embed}(x)$ $u \leftarrow h + \text{PositionEmbeddings}$ $u \leftarrow \text{MaskedTransformerBlock}_1(\text{TransformerBlock}_2(u)) \times L_{upper}/2$ $h \leftarrow \text{ShiftDown}(u) + \text{ShiftRight}(h) + \text{PositionEmbeddings}$ $h \leftarrow \text{MaskedTransformerBlock}_2(h) \times L_{row}$ \hfill (Eqn. 13)

The tensor u represents context captured above a current (or given) pixel. It may be computed by unmasked row and masked column attention layers, repeated to a total of $L_{upper}$ layers to increase model capacity, which enable u to cover the receptive field at all rows above, and include the current pixel. The ShiftDown operation shifts u down one pixel, which shifts its receptive field up one pixel. Accordingly, all pixels above may be covered for conditioning purposes, while excluding pixels in the current row, which may be added to h as input to the masked row layers. By applying such a procedure, a row-wise model described above may be converted into a fully expressive autoregressive model that captures pixels in the current row in addition to pixels in the preceding row above the current row.

In some embodiments, the final h may be passed through layer normalization, and a final dense layer, to produce logits with shape H×W×256. The logits at each location depend on all previous pixel locations in the raster scan ordering.

C. Semi Parallel Sampling

Naive implementations of sampling from sequential models may be slow because they require re-evaluating an entire network to sample each location. In the case of the model described herein for a square image of size $\sqrt{N} \times \sqrt{N}$, each network evaluation may take $O(N\sqrt{N}(L_{upper}+L_{row}))$ time. Therefore, sampling the entire image may take $O(N^2\sqrt{N}(L_{upper}+L_{row}))$ time, which may be very large when N is large. Accordingly, the architecture described herein may be configured to perform faster sampling, such that large sections of the model may be computed in parallel. An algorithm for sampling may be based on a pseudocode as follows:

1. For each row $i \in [1,H]$:
  (a) Compute the upper context u including information about all $x_{<i,*}$ using the upper layers
  (b) For each column $j \in [1,W]$:
    i. Sample $x_{i,j}$ conditioned on u and prior elements of row i ($x_{<i,<j}$).

The $L_{row}$ row-wise layers are independent over rows as they depend on other rows only through the upper context. Accordingly, sampling one row may be accomplished by evaluating the row-wise layers for one row only, and not for other rows. Thus, in one row of $\sqrt{N}$ pixels, each pixel may be sampled in $O(NL_{row})$ time. Accordingly, all pixels may be sampled in $O(N^2L_{row})$ time. Also, for example, before each of the $\sqrt{N}$ rows may be sampled, the upper context can be computed in $O(N\sqrt{N}L_{upper})$ time, for a total of $O(N^2L_{upper})$ over the course of all rows. Accordingly, a total computational time may be estimated to be $O(N^2(L_{row}+L_{upper}))$ time, which is $\sqrt{N}$ faster than the naive implementation. This results in a significant improvement of computational time for sampling for images and videos, and a corresponding reduction of computational resources that may be expended.

Model for Multi-Channel Images and Videos

As described, an architecture for a single-channel image of shape H×W may be configured. Such an architecture may be extended to multi-channel images or videos of shape H×W×C, where C may denote a number of channels in a multi-channel image, or a product of the number of channels and time steps in a video). One way to model such data of shape H×W×C may be to stack the channels on top of each other into a single-channel image of shape (H·C)×W or H×(W·C). Such a procedure may be implemented easily, but may increase a sequence length for column attention or row attention, which may be large for large C. In some embodiments, one channel may be modeled at a time as a single-channel image, and conditioned on previous channels using an extra set of unmasked row and unmasked column attention layers. Accordingly, a model of the form $p(x_{:,:,c}|x_{:,:,<c})$ may be configured, where previous channels $x_{:,:,<c}$ may be processed into a H×W×D tensor of context information, which may subsequently be added into the first encoding blocks of the model for the single channel encoder. The parameters may not be shared among any of these layers.

Some embodiments involve training the neural network to receive a given input image associated with the first characteristic (e.g., a grayscale image), and apply axial attention to transform the given input image to an output image associated with the second characteristic (e.g., a colorization of the grayscale image). At training time, training may be performed on a random channel slice of each image. For example, previous slices using these unmasked attention layers may be used to produce a context tensor, and the likelihood of the randomly chosen slice conditioned on this context may be maximized. In some aspects, this may be similar to training on an unbiased estimate of log likelihood for the whole data tensor. The architecture may be trained to minimize the negative log-likelihood (Eq. 7) of the data. Note that $p_c/\tilde{p}_c$, $\tilde{p}_{s\uparrow}$, and $\tilde{p}_{c\uparrow}$ may be maximized independently and therefore refer to different models. The log-likelihood may be determined as:

$\mathcal{L} = (1-\lambda)\log p_c + \lambda \log \tilde{p}_c + \log \tilde{p}_{c\uparrow} + \log \tilde{p}_{s\uparrow}$ \hfill (Eqn. 14)

In some embodiments, the training of the neural network involves training the neural network based on an object detection network trained to detect one or more objects in the given input image.

In some embodiments, the generating of the output image involves generating an intermediate output image by applying parallel downsampling to each pixel of the array of pixels, wherein the first intermediate output image comprises one or more of an intermediate color depth, an intermediate color intensity, an intermediate spatial resolution, or an intermediate color resolution. Such embodiments also involve parallel upsampling of each pixel in the intermediate output image to a respective one or more of an output color depth, an output color intensity, an output spatial resolution, or an output color resolution.

Some embodiments involve generating a first intermediate output image comprising an intermediate color depth by applying parallel downsampling to each pixel of the array of pixels. Such embodiments also involve generating a second intermediate output image comprising an intermediate color intensity by applying parallel downsampling to each pixel of the first intermediate output image. Some embodiments involve parallel upsampling of each pixel in the second intermediate output image, from the intermediate color intensity to a target color intensity. Such embodiments also involve parallel upsampling of each pixel in the upsampled second intermediate output image, from the intermediate color depth to a target color depth.

Figure 4B:
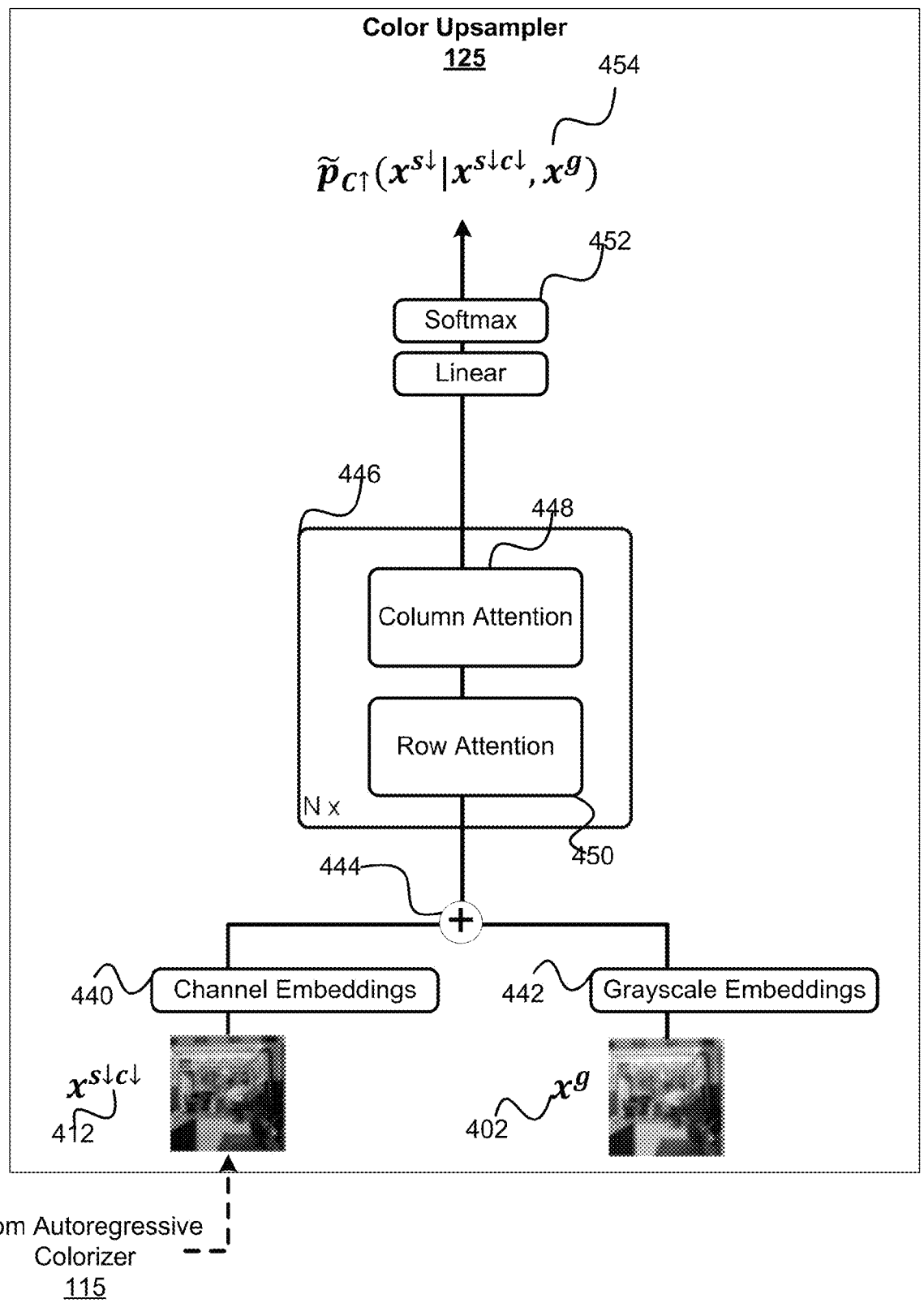
FIG. 4B illustrates an example color upsampler, in accordance with example embodiments.

FIG. 4B illustrates an example color upsampler 125, in accordance with example embodiments. In order to produce high-fidelity colorized images from low resolution, coarse color images, such as, for example, intermediate image $x^{s\downarrow c\downarrow}$ 212, and a given high resolution input image, such as, for example, input image $x^g$ 402, color upsampler 125 and spatial upsampler 135 may be trained. In some embodiments, these two models may share the same architecture while differing in their respective inputs and resolution at which they operate. Similar to the encoder of autoregressive colorizer 115, color upsampler 125 and spatial upsampler 135 comprise multiple layers of alternating row-/column self-attention layers. The output of the encoder is projected to compute the logits underlying the per pixel color probabilities of the respective upsampler.

Coarse color images, such as, for example, intermediate image 212, $x^{s\downarrow c\downarrow} \in \mathbb{R}^{H\downarrow \times W\downarrow \times 1}$ of 512 colors may be converted back into a 3 bit RGB image with 8 symbols per channel. For example, intermediate conditional distribution 232 represented as $\tilde{p}_c(x^{s\downarrow c\downarrow}|x^g)$ generated by autoregressive colorizer 115 may be utilized to generate channel embeddings 240 for intermediate image 212, $x^{s\downarrow c\downarrow}$. The channels may be embedded (e.g., channel embeddings 240) using separate embedding matrices to $x_k^{s\downarrow c\downarrow} \in \mathbb{R}^{H\downarrow \times W\downarrow \times D}$, where $k \in \{R,G,B\}$ indicates the channel. In some embodiments, each channel may be upsampled by individually conditioning only on the respective channel's embedding. The channel embedding 240 may be summed at step 244 with the respective grayscale and position embeddings 242 for each pixel and serve as input to the subsequent self-attention layers, fourth encoder 246. For example, fourth encoder 246 may represent a layer of column attention 248 and row attention 250. In some embodiments, fourth encoder 246 may comprise multiple layers, such as N layers. A third softmax 252 may be applied to the output of fourth encoder 246 to project the output to per-pixel-channel probability distributions 254, represented as $\tilde{p}_{c\uparrow}(x_k^{s\downarrow}|x^{s\downarrow c\downarrow}, x^g) \in \mathbb{R}^{H\downarrow \times W\downarrow \times 256}$, over 256 color intensities, and for each channel $k \in \{R,G,B\}$.

Figure 4C:
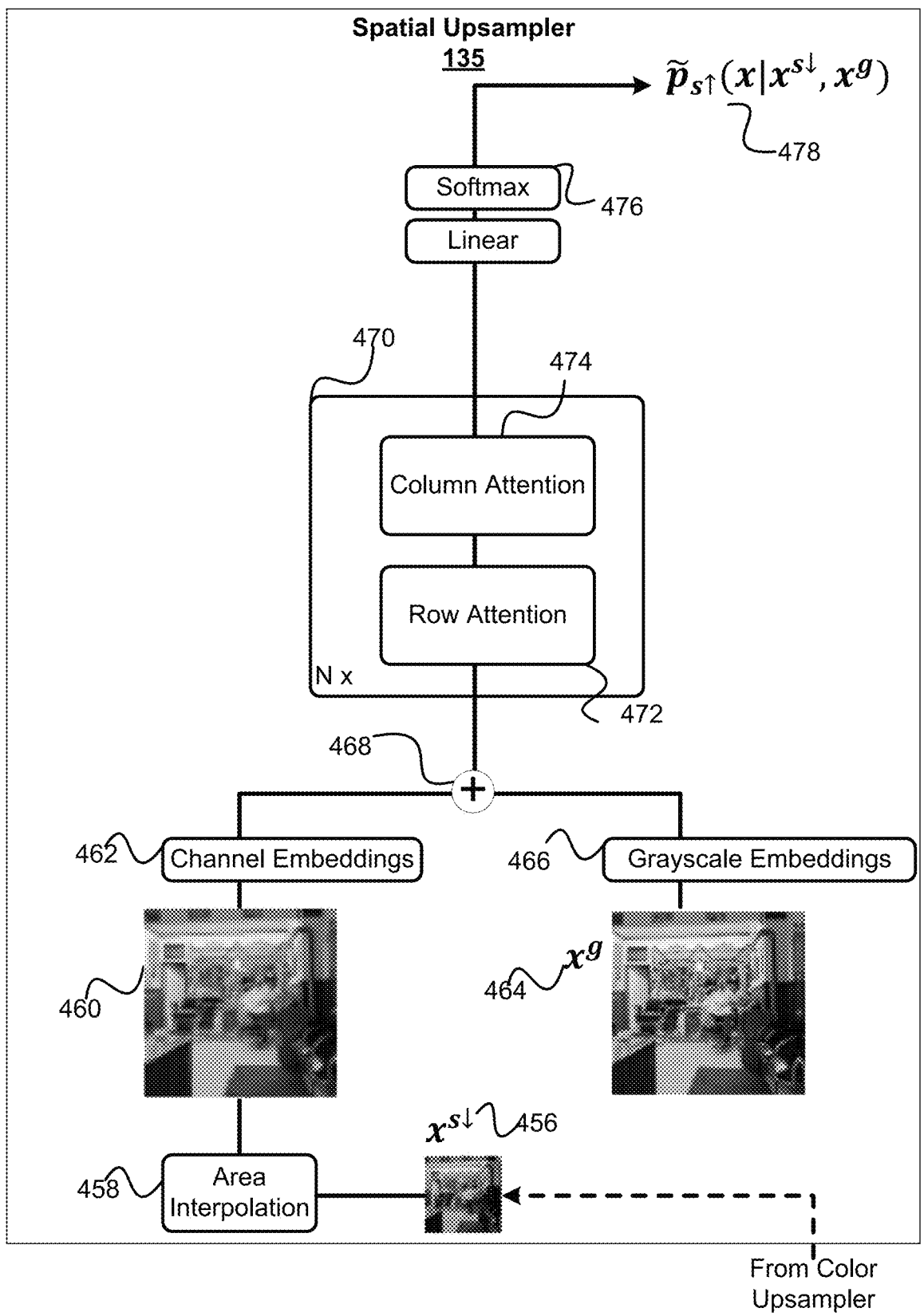
FIG. 4C illustrates an example spatial upsampler, in accordance with example embodiments.

FIG. 4C illustrates an example spatial upsampler 135, in accordance with example embodiments. In some embodiments, parallel upsampling may be effective for high quality colorizations. In an effort to avoid minor color inconsistencies between pixels that could stem from parallel sampling, in some embodiments, instead of sampling, a most likely color may be predicted for every pixel. Even though this may appear to somewhat limit a potential diversity of colorizations, sampling only coarse colors may generally enable generation of a variety of colorizations. Parallel upsampling may have a technical advantage of faster color generation, thereby leading to considerable increase in speed for full autoregressive models on high resolution.

In some embodiments, per-pixel-channel probability distributions 254, represented as $\tilde{p}_{c\uparrow}(x_k^{s\downarrow}|x^{s\downarrow c\downarrow}, x^g)$ may be received from color upsampler 125 to naively upsample a downsampled intermediate image 256, represented as $x^{s\downarrow} \in \mathbb{R}^{H\downarrow \times W\downarrow \times 3}$, into a blurry, high-resolution RGB image using area interpolation 258. As described with reference to color upsampler 125 of FIG. 1 or FIG. 4B, each channel of a blurry RGB image may be embedded. For example, the channels may be embedded (e.g., channel embeddings 262) using separate embedding matrices to $x_k^{s\downarrow c\downarrow} \in \mathbb{R}^{H\downarrow \times W\downarrow \times D}$, where $k \in \{R, G, B\}$ indicates the channel. In some embodiments, each channel may be upsampled by individually conditioning only on the respective channel's embedding. The channel embedding 262 may be summed at step 268 with the respective grayscale and position embeddings 266 for each pixel and serve as input to the subsequent self-attention layers, fifth encoder 270. For example, fifth encoder 270 may represent a layer of column attention 274 and row attention 272. In some embodiments, fifth encoder 270 may comprise multiple layers, such as N layers. A fourth softmax 276 may be applied to the output of fifth encoder 270 to project the output to per-pixel-channel probability distributions 278, represented as $\tilde{p}_{s\uparrow}(x_k|x^{s\downarrow}, x_g) \in \mathbb{R}^{H \times W \times 256}$, over 256 color intensities, and for each channel $k \in \{R, G, B\}$.

Figure 5:
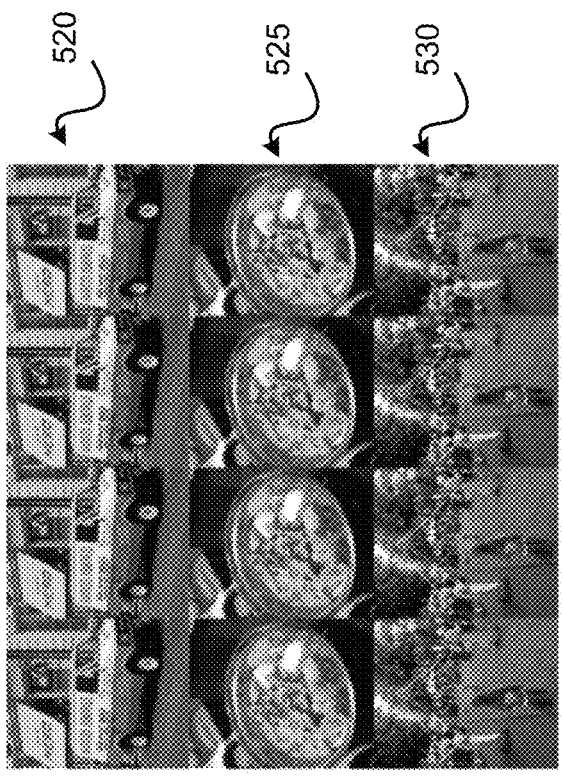
FIG. 5 illustrates example images of colorizations applied to grayscale images, in accordance with example embodiments.
Figure 5:
Figure 5:
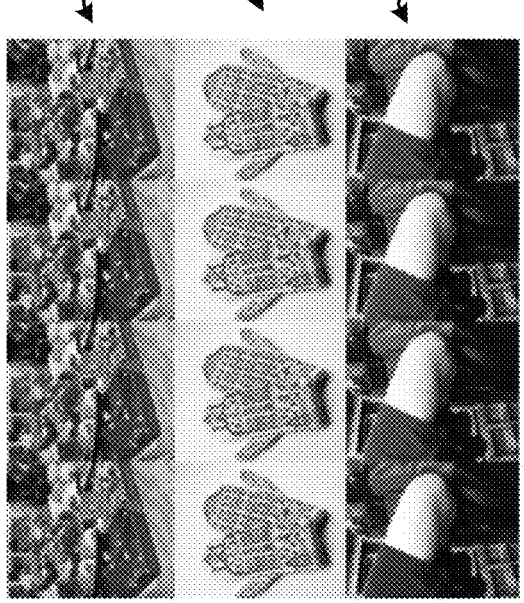

FIG. 5 illustrates example images of colorizations applied to grayscale images, in accordance with example embodiments. In each row of images, 510, 515, 520, 525, 530, 535, 540, and 545, a first grayscale image is shown, along with three colorizations of the grayscale image.

Figure 6A:
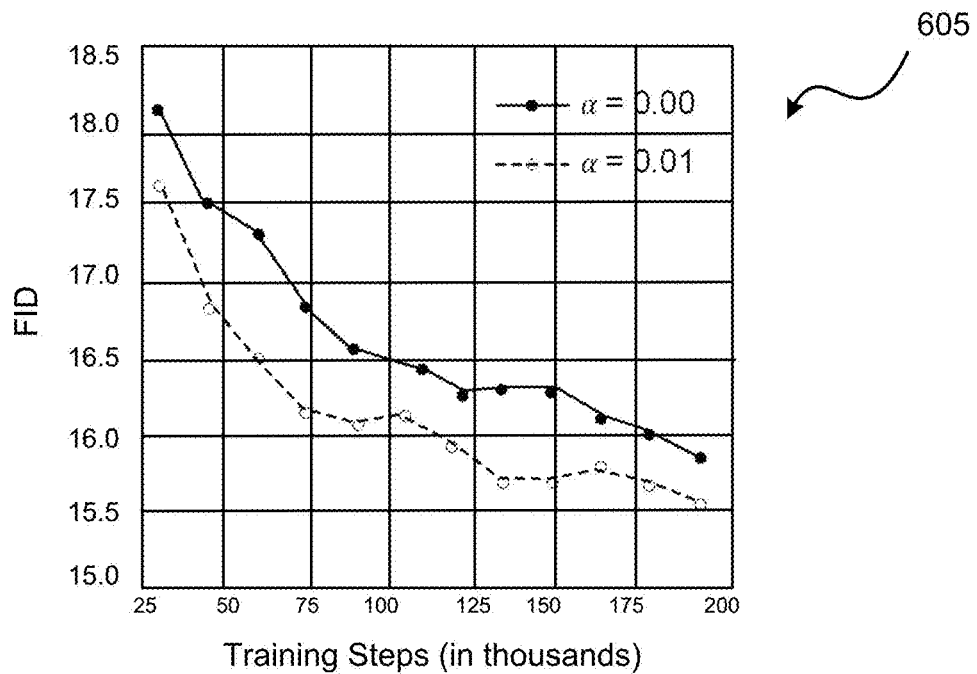
FIGS. 6A and 6B illustrate example graphical representations of hyperparameter selections in training a neural network, in accordance with example embodiments.
Figure 6B:
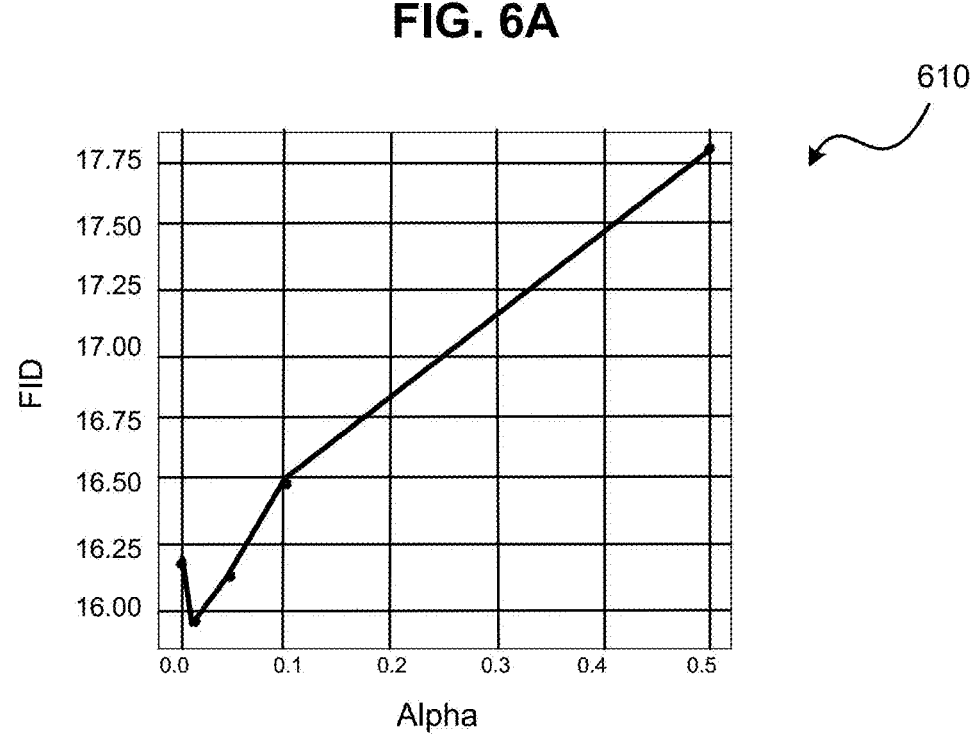

FIGS. 6A and 6B illustrate example graphical representations of hyperparameter selections in training a neural network, in accordance with example embodiments. Graph 605 illustrates that at $\alpha=0.01$, the model converges faster to a better FID. Graph 610 illustrates that at higher values of $\alpha$, the performance of the model may deteriorate quickly.

Figure 7:
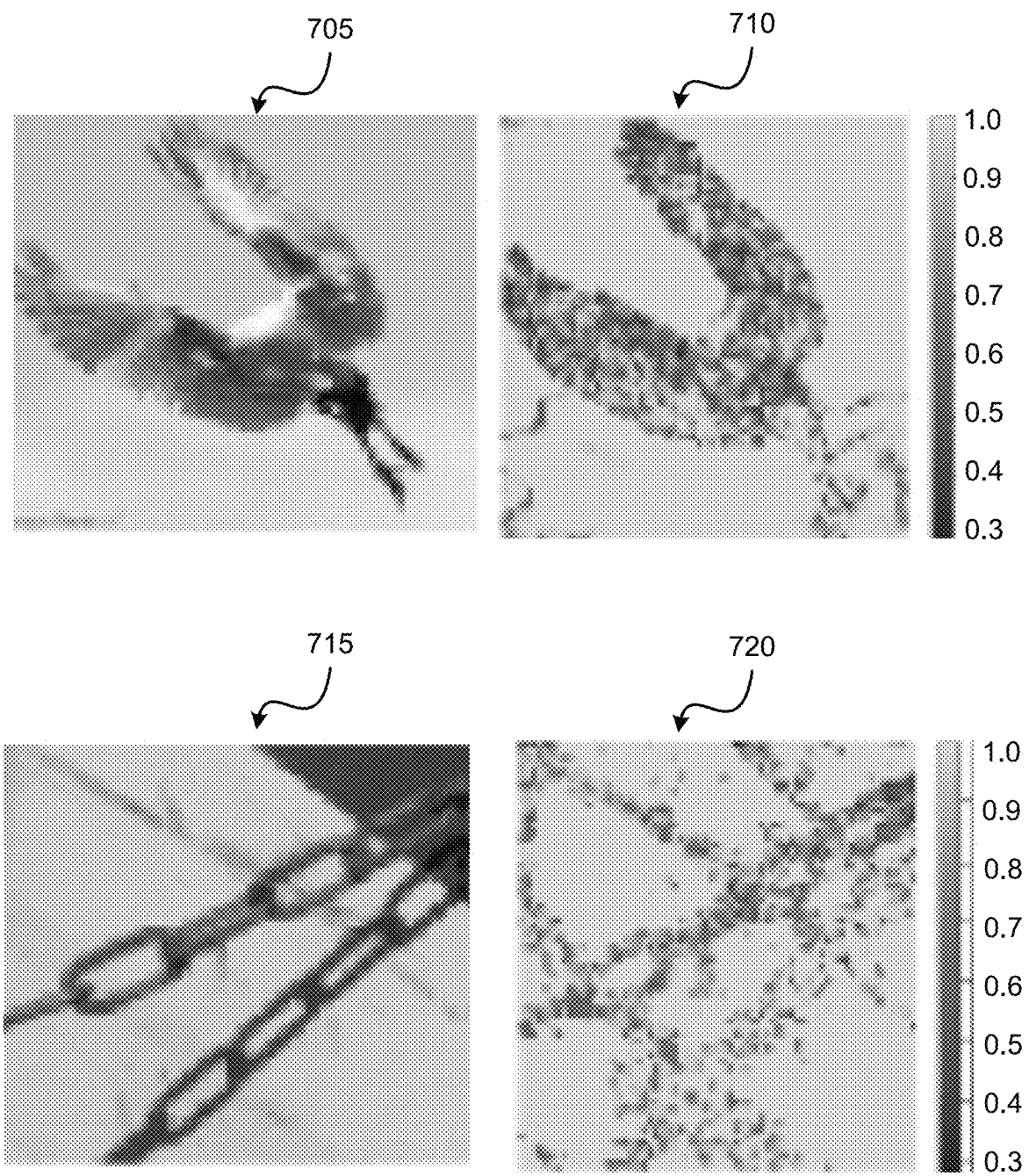
FIG. 7 illustrates example graphical representations of predicted probability distributions based on a grayscale image, in accordance with example embodiments.

FIG. 7 illustrates example graphical representations of predicted probability distributions based on a grayscale image, in accordance with example embodiments. A per-pixel, maximum predicted probability over 512 colors are displayed as a proxy for uncertainty. For example, image 710 is a per-pixel, maximum predicted probability over 512 colors for image 705. As another example, image 720 is a per-pixel, maximum predicted probability over 512 colors for image 715.

Evaluations

Axial Transformers may be evaluated on image and video modelling benchmarks. Generally, Axial Transformer achieves state-of-the-art results on ImageNet-32 and on ImageNet-64. By stacking a video along the channel dimension, the Axial Transformer can be directly applied to the channel-stacked video with minimal modifications. The Axial Transformer also outperforms previous results without using an architecture specially designed for videos. The generated samples on these datasets are generally of expected high quality.

Axial Transformers do not require subroutines for GPUs or TPUs that may exhibit unfavorable memory bandwidth and computation trade-offs. Axial Transformers are simple to implement using efficient operations that are available in deep learning frameworks.

In some aspects, a combination of an Axial Transformer and an LSTM inner decoder performs well on the ImageNet32 and ImageNet64 benchmarks, thereby also demonstrating the effectiveness of the remaining parts of the Axial Transformer that capture the context from the preceding rows. Also, for example, the full four layers of the inner decoder of the Axial Transformer provide an additional boost in performance as well as significantly faster training. The combination of the Axial Transformer and the LSTM inner decoder has the advantage of requiring a small number of matrix-vector products to compute the layers at each autoregressive step, comparing favorably with about the 12 matrix-vector products required by the Axial Transformer.

Example Applications

In one aspect, an input dataset, such as a collection of multidimensional feature vectors can be transformed to output a modified collection of multidimensional feature vectors. For example, an input image associated with a first characteristic can be transformed to an output image associated with a second characteristic. For example, a grayscale image can be transformed to output a high fidelity colorization. For example, black and white photographs, low resolution images, blurry images, and/or images with imperfect and/or undesirable colorizations, can be converted to output high fidelity colorizations.

In some example embodiments, an input image can be converted to output an enhanced version of the input image. For example, a grayscale image can be enhanced to a high resolution black and white image. Also, for example, a colored image can be enhanced to a high resolution colored image.

In another aspect, a grayscale video can be converted to output a high fidelity colorization of the video. For example, older black and white videos can be converted to obtain realistic colorizations. Also, for example, an image resolution of a video may be enhanced. As another example, a color depth or color intensity of a video may be enhanced.

In another aspect, the conversion from a first image to a target (e.g., high resolution, high fidelity, colored) image can be performed by a mobile device, such as a mobile phone device. For example, a user may access an image captured by a camera of the mobile phone device, and indicate a desire to modify the accessed image. Accordingly, the captured image can be converted by the mobile phone device to output a desired image. In some implementations, the user may be provided with one or more output images, and the user may select from the one or more output images.

In some example embodiments, the user may access the image from an image library. In other example embodiments, the user may receive the image via the mobile phone device, for example, for another user, or download it from an image server.

For example, the user may retrieve a black and white video from a video server to a mobile phone device, and the user may then indicate a desire to colorize the retrieved video. Accordingly, the retrieved video can be converted by the mobile phone device to output a high fidelity, colorized video.

In some example embodiments, the neural network architecture can be used for image editing.

In some example embodiments, the neural network can be used as a pre-processing step for another machine learning model.

In some example embodiments, the neural network architecture can be used to transform and/or enhance any dataset represented as multidimensional feature vectors.

These and other example applications are contemplated within a scope of this disclosure.

Figure 8:
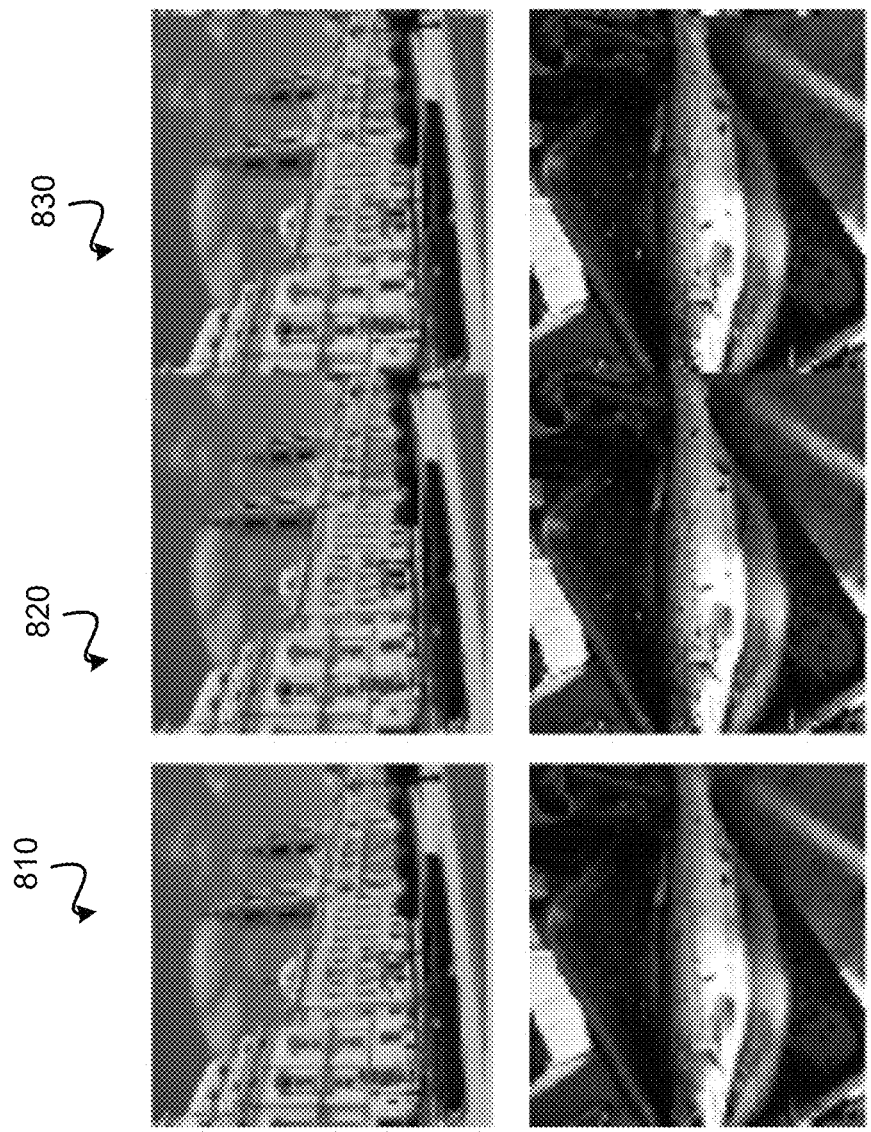
FIG. 8 illustrates examples of ground truth images and predicted colorizations of the images, in accordance with example embodiments.

FIG. 8 illustrates examples of ground truth images and predicted colorizations of the images, in accordance with example embodiments. In each column, the ground truth image is depicted followed by two samples. For example, images in column 810 correspond to ground truth images. Images in columns 820 and 830 illustrate diverse and real colorizations. Images illustrate how realism improves from the first sample in column 820 to the second sample in column 830.

Figure 9:
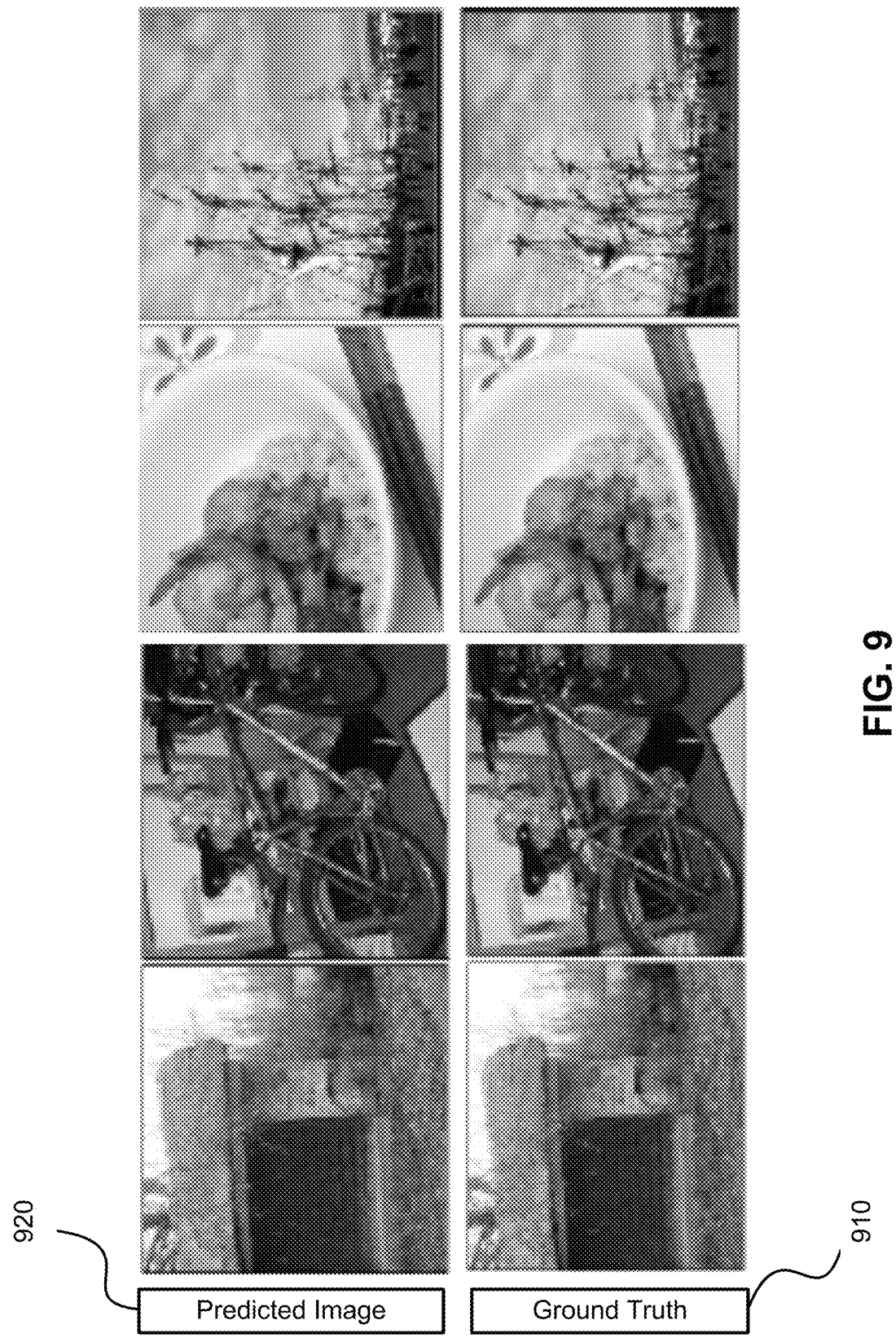
FIG. 9 illustrates examples of ground truth images and predicted colorizations of the images, in accordance with example embodiments.

FIG. 9 illustrates examples of ground truth images and predicted colorizations of the images, in accordance with example embodiments. In each set of images, the bottom row 910 corresponds to a ground truth, and the top row 920 corresponds to a predicted colorization.

Training Machine Learning Models for Generating Inferences/Predictions

Figure 10:
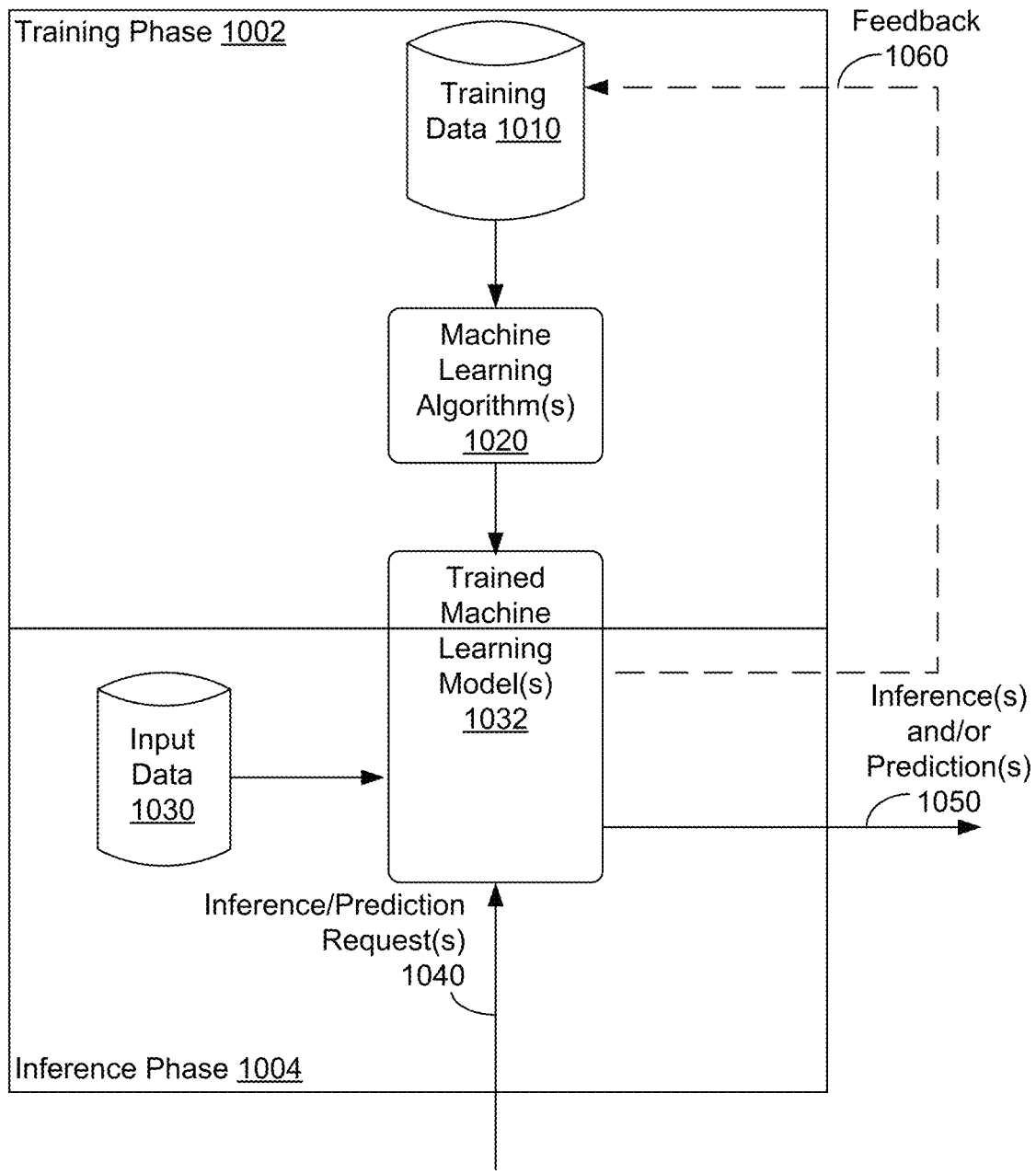
FIG. 10 is a diagram illustrating training and inference phases of a machine learning model, in accordance with example embodiments.

FIG. 10 shows diagram 1000 illustrating a training phase 1002 and an inference phase 1004 of trained machine learning model(s) 1032, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 10 shows training phase 1002 where one or more machine learning algorithms 1020 are being trained on training data 1010 to become trained machine learning model 1032. Then, during inference phase 1004, trained machine learning model 1032 can receive input data 1030 and one or more inference/prediction requests 1040 (perhaps as part of input data 1030) and responsively provide as an output one or more inferences and/or predictions 1050.

As such, trained machine learning model(s) 1032 can include one or more models of one or more machine learning algorithms 1020. Machine learning algorithm(s) 1020 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1020 may be supervised or unsupervised, and may implement any suitable combination of online and offline learning.

In some examples, machine learning algorithm(s) 1020 and/or trained machine learning model(s) 1032 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1020 and/or trained machine learning model(s) 1032. In some examples, trained machine learning model(s) 1032 can be trained, reside and execute to provide inferences on a particular computing device, and/or otherwise can make inferences for the particular computing device.

During training phase 1002, machine learning algorithm(s) 1020 can be trained by providing at least training data 1010 as training input using unsupervised, supervised, semi-supervised, and/or reinforcement learning techniques. Unsupervised learning involves providing a portion (or all) of training data 1010 to machine learning algorithm(s) 1020 and machine learning algorithm(s) 1020 determining one or more output inferences based on the provided portion (or all) of training data 1010. Supervised learning involves providing a portion of training data 1010 to machine learning algorithm(s) 1020, with machine learning algorithm(s) 1020 determining one or more output inferences based on the provided portion of training data 1010, and the output inference(s) are either accepted or corrected based on correct results associated with training data 1010. In some examples, supervised learning of machine learning algorithm(s) 1020 can be governed by a set of rules and/or a set of labels for the training input, and the set of rules and/or set of labels may be used to correct inferences of machine learning algorithm(s) 1020.

Semi-supervised learning involves having correct results for part, but not all, of training data 1010. During semi-supervised learning, supervised learning is used for a portion of training data 1010 having correct results, and unsupervised learning is used for a portion of training data 1010 not having correct results. Reinforcement learning involves machine learning algorithm(s) 1020 receiving a reward signal regarding a prior inference, where the reward signal can be a numerical value. During reinforcement learning, machine learning algorithm(s) 1020 can output an inference and receive a reward signal in response, where machine learning algorithm(s) 1020 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1020 and/or trained machine learning model(s) 1032 can be trained using other machine learning techniques, including but not limited to, incremental learning and curriculum learning.

In some examples, machine learning algorithm(s) 1020 and/or trained machine learning model(s) 1032 can use transfer learning techniques. For example, transfer learning techniques can involve trained machine learning model(s) 1032 being pre-trained on one set of data and additionally trained using training data 1010. More particularly, machine learning algorithm(s) 1020 can be pre-trained on data from one or more computing devices and a resulting trained machine learning model provided to computing device CD1, where CD1 is intended to execute the trained machine learning model during inference phase 1004. Then, during training phase 1002, the pre-trained machine learning model can be additionally trained using training data 1010, where training data 1010 can be derived from kernel and non-kernel data of computing device CD1. This further training of the machine learning algorithm(s) 1020 and/or the pre-trained machine learning model using training data 1010 of CD1's data can be performed using either supervised or unsupervised learning. Once machine learning algorithm(s) 1020 and/or the pre-trained machine learning model has been trained on at least training data 1010, training phase 1002 can be completed. The trained resulting machine learning model can be utilized as at least one of trained machine learning model(s) 1032.

In particular, once training phase 1002 has been completed, trained machine learning model(s) 1032 can be provided to a computing device, if not already on the computing device. Inference phase 1004 can begin after trained machine learning model(s) 1032 are provided to computing device CD1.

During inference phase 1004, trained machine learning model(s) 1032 can receive input data 1030 and generate and output one or more corresponding inferences and/or predictions 1050 about input data 1030. As such, input data 1030 can be used as an input to trained machine learning model(s) 1032 for providing corresponding inference(s) and/or prediction(s) 1050 to kernel components and non-kernel components. For example, trained machine learning model(s) 1032 can generate inference(s) and/or prediction(s) 1050 in response to one or more inference/prediction requests 1040. In some examples, trained machine learning model(s) 1032 can be executed by a portion of other software. For example, trained machine learning model(s) 1032 can be executed by an inference or prediction daemon to be readily available to provide inferences and/or predictions upon request. Input data 1030 can include data from computing device CD1 executing trained machine learning model(s) 1032 and/or input data from one or more computing devices other than CD1.

Input data 1030 can include a collection of images provided by one or more sources. The collection of images can include video frames, images resident on computing device CD1, and/or other images. Other types of input data are possible as well.

Inference(s) and/or prediction(s) 1050 can include output images, output intermediate images, numerical values, and/or other output data produced by trained machine learning model(s) 1032 operating on input data 1030 (and training data 1010). In some examples, trained machine learning model(s) 1032 can use output inference(s) and/or prediction(s) 1050 as input feedback 1060. Trained machine learning model(s) 1032 can also rely on past inferences as inputs for generating new inferences.

A conditioned, axial self-attention based neural network can be an example of machine learning algorithm(s) 1020. After training, the trained version of the neural network can be an example of trained machine learning model(s) 1032. In this approach, an example of inference/prediction request(s) 1040 can be a request to predict colorizations of a grayscale image and a corresponding example of inferences and/or prediction(s) 1050 can be an output image including the colorizations of the grayscale image. Another example of inference/prediction request(s) 1040 can be a request to predict a spatial upscaling of an image and a corresponding example of inferences and/or prediction(s) 1050 can be an output image including the spatially upscaled input image.

In some examples, one computing device CD_SOLO can include the trained version of the conditioned, axial self-attention based neural network, perhaps after training. Then, computing device CD_SOLO can receive a request to request to transform an input image associated with a first characteristic to an output image associated with a second characteristic, and use the trained version of the neural network to generate the output image associated with the second characteristic.

In some examples, two or more computing devices CD_CLI and CD_SRV can be used to provide output images; e.g., a first computing device CD_CLI can generate and send requests to convert a grayscale image to a second computing device CD_SRV. Then, CD_SRV can use the trained version of the neural network, to generate output images that convert the grayscale image to a colorization of the grayscale image, and respond to the requests from CD_CLI for the output images. Then, upon reception of responses to the requests, CD_CLI can provide the requested output images (e.g., using a user interface and/or a display, a printed copy, an electronic communication, etc.).

Example Data Network

Figure 11:
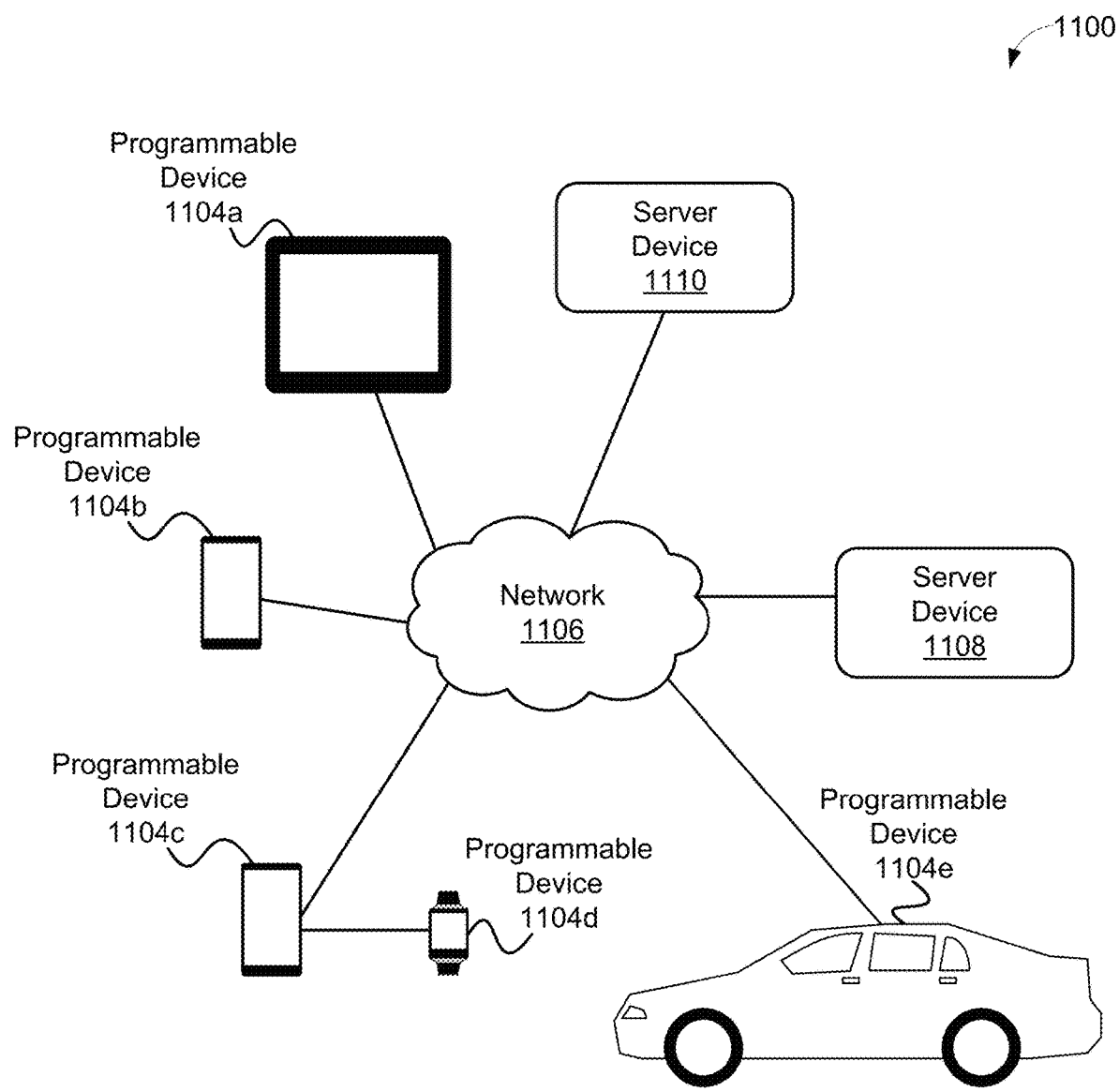
FIG. 11 depicts a distributed computing architecture, in accordance with example embodiments.

FIG. 11 depicts a distributed computing architecture 1100, in accordance with example embodiments. Distributed computing architecture 1100 includes server devices 1108, 1110 that are configured to communicate, via network 1106, with programmable devices 1104a, 1104b, 1104c, 1104d, 1104e. Network 1106 may correspond to a local area network (LAN), a wide area network (WAN), a WLAN, a WWAN, a corporate intranet, the public Internet, or any other type of network configured to provide a communications path between networked computing devices. Network 1106 may also correspond to a combination of one or more LANs, WANs, corporate intranets, and/or the public Internet.

Although FIG. 11 only shows five programmable devices, distributed application architectures may serve tens, hundreds, or thousands of programmable devices. Moreover, programmable devices 1104a, 1104b, 1104c, 1104d, 1104e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1104a, 1104b, 1104c, 1104e, programmable devices can be directly connected to network 1106. In other examples, such as illustrated by programmable device 1104d, programmable devices can be indirectly connected to network 1106 via an associated computing device, such as programmable device 1104c. In this example, programmable device 1104c can act as an associated computing device to pass electronic communications between programmable device 1104d and network 1106. In other examples, such as illustrated by programmable device 1104e, a computing device can be part of and/or inside a vehicle, such as a car, a truck, a bus, a boat or ship, an airplane, etc. In other examples not shown in FIG. 11, a programmable device can be both directly and indirectly connected to network 1106.

Server devices 1108, 1110 can be configured to perform one or more services, as requested by programmable devices 1104a-1104e. For example, server device 1108 and/or 1110 can provide content to programmable devices 1104a-1104e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1108 and/or 1110 can provide programmable devices 1104a-1104e with access to software for database, search, computation, graphical, audio, video, World Wide Web/Internet utilization, and/or other functions. Many other examples of server devices are possible as well.

Computing Device Architecture

Figure 12:
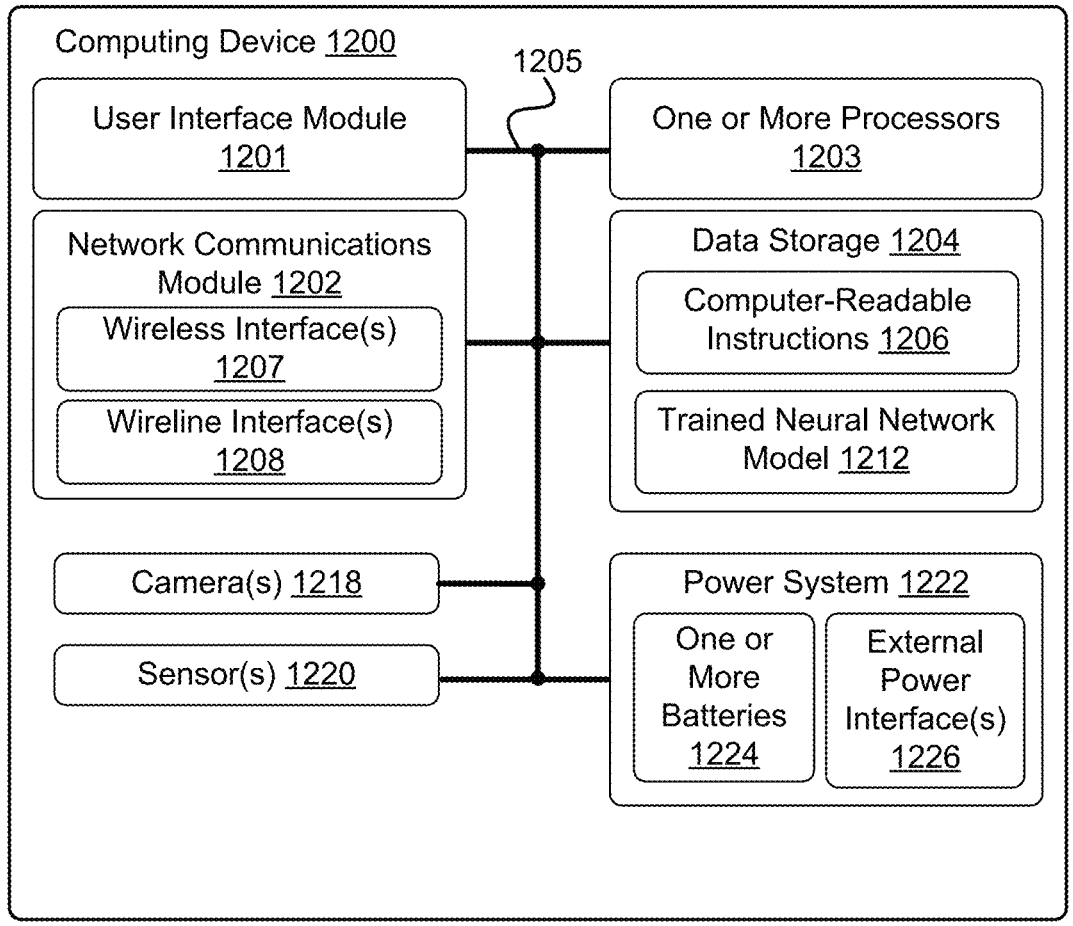
FIG. 12 is a block diagram of a computing device, in accordance with example embodiments.

FIG. 12 is a block diagram of an example computing device 1200, in accordance with example embodiments. In particular, computing device 1200 shown in FIG. 12 can be configured to perform at least one function of and/or related to a conditioned, axial self-attention based neural network, and/or method 1400.

Computing device 1200 may include a user interface module 1201, a network communications module 1202, one or more processors 1203, data storage 1204, one or more cameras 1218, one or more sensors 1220, and power system 1222, all of which may be linked together via a system bus, network, or other connection mechanism 1205.

User interface module 1201 can be operable to send data to and/or receive data from external user input/output devices. For example, user interface module 1201 can be configured to send and/or receive data to and/or from user input devices such as a touch screen, a computer mouse, a keyboard, a keypad, a touch pad, a trackball, a joystick, a voice recognition module, and/or other similar devices. User interface module 1201 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1201 can also be configured to generate audible outputs, with devices such as a speaker, speaker jack, audio output port, audio output device, earphones, and/or other similar devices. User interface module 1201 can further be configured with one or more haptic devices that can generate haptic outputs, such as vibrations and/or other outputs detectable by touch and/or physical contact with computing device 1200. In some examples, user interface module 1201 can be used to provide a graphical user interface (GUI) for utilizing computing device 1200, such as, for example, a graphical user interface of a mobile phone device.

Network communications module 1202 can include one or more devices that provide one or more wireless interfaces 1207 and/or one or more wireline interfaces 1208 that are configurable to communicate via a network. Wireless interface(s) 1207 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1202 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1203 can include one or more general purpose processors, and/or one or more special purpose processors (e.g., digital signal processors, tensor processing units (TPUs), graphics processing units (GPUs), application specific integrated circuits, etc.). One or more processors 1203 can be configured to execute computer-readable instructions 1206 that are contained in data storage 1204 and/or other instructions as described herein.

Data storage 1204 can include one or more non-transitory computer-readable storage media that can be read and/or accessed by at least one of one or more processors 1203. The one or more computer-readable storage media can include volatile and/or non-volatile storage components, such as optical, magnetic, organic or other memory or disc storage, which can be integrated in whole or in part with at least one of one or more processors 1203. In some examples, data storage 1204 can be implemented using a single physical device (e.g., one optical, magnetic, organic or other memory or disc storage unit), while in other examples, data storage 1204 can be implemented using two or more physical devices.

Data storage 1204 can include computer-readable instructions 1206 and perhaps additional data. In some examples, data storage 1204 can include storage required to perform at least part of the herein-described methods, scenarios, and techniques and/or at least part of the functionality of the herein-described devices and networks. In some examples, data storage 1204 can include storage for a trained neural network model 1212 (e.g., a model of trained neural networks such as conditioned, axial self-attention based neural networks). In particular of these examples, computer-readable instructions 1206 can include instructions that, when executed by processor(s) 1203, enable computing device 1200 to provide for some or all of the functionality of trained neural network model 1212.

In some examples, computing device 1200 can include one or more cameras 1218. Camera(s) 1218 can include one or more image capture devices, such as still and/or video cameras, equipped to capture light and record the captured light in one or more images; that is, camera(s) 1218 can generate image(s) of captured light. The one or more images can be one or more still images and/or one or more images utilized in video imagery. Camera(s) 1218 can capture light and/or electromagnetic radiation emitted as visible light, infrared radiation, ultraviolet light, and/or as one or more other frequencies of light.

In some examples, computing device 1200 can include one or more sensors 1220. Sensors 1220 can be configured to measure conditions within computing device 1200 and/or conditions in an environment of computing device 1200 and provide data about these conditions. For example, sensors 1220 can include one or more of: (i) sensors for obtaining data about computing device 1200, such as, but not limited to, a thermometer for measuring a temperature of computing device 1200, a battery sensor for measuring power of one or more batteries of power system 1222, and/or other sensors measuring conditions of computing device 1200; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1200, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1200, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1200, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1220 are possible as well.

Power system 1222 can include one or more batteries 1224 and/or one or more external power interfaces 1226 for providing electrical power to computing device 1200. Each battery of the one or more batteries 1224 can, when electrically coupled to the computing device 1200, act as a source of stored electrical power for computing device 1200. One or more batteries 1224 of power system 1222 can be configured to be portable. Some or all of one or more batteries 1224 can be readily removable from computing device 1200. In other examples, some or all of one or more batteries 1224 can be internal to computing device 1200, and so may not be readily removable from computing device 1200. Some or all of one or more batteries 1224 can be rechargeable. For example, a rechargeable battery can be recharged via a wired connection between the battery and another power supply, such as by one or more power supplies that are external to computing device 1200 and connected to computing device 1200 via the one or more external power interfaces. In other examples, some or all of one or more batteries 1224 can be non-rechargeable batteries.

One or more external power interfaces 1226 of power system 1222 can include one or more wired-power interfaces, such as a USB cable and/or a power cord, that enable wired electrical power connections to one or more power supplies that are external to computing device 1200. One or more external power interfaces 1226 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1226, computing device 1200 can draw electrical power from the external power source the established electrical power connection. In some examples, power system 1222 can include related sensors, such as battery sensors associated with the one or more batteries or other types of electrical power sensors.

Cloud-Based Servers

Figure 13:
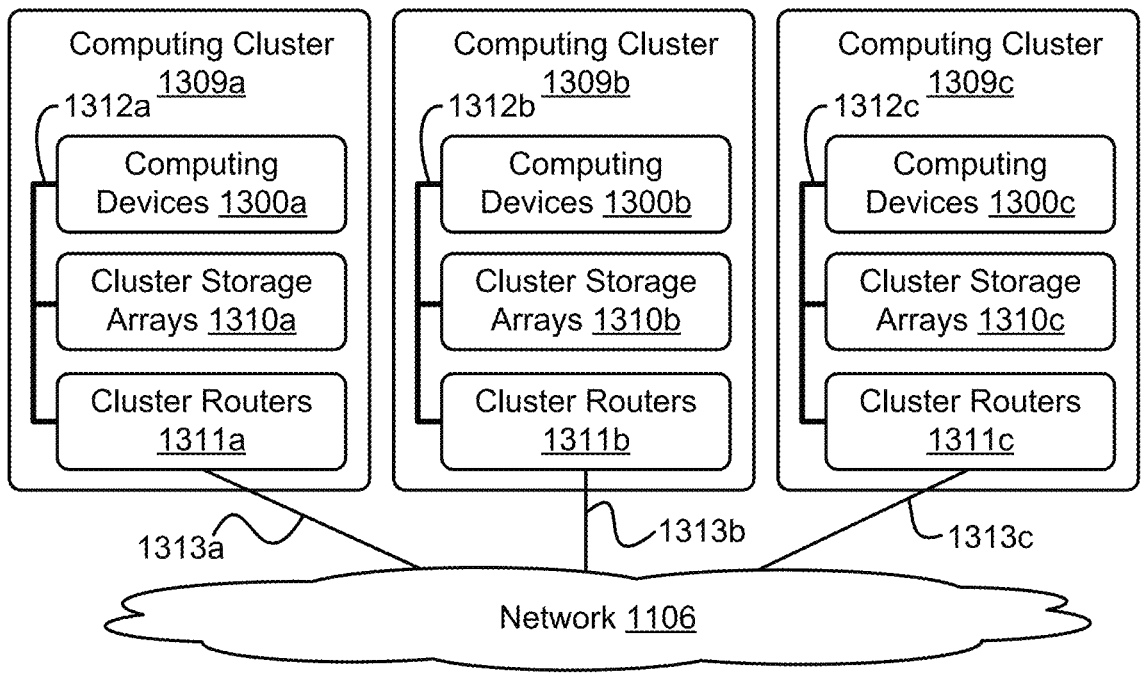
FIG. 13 depicts a network of computing clusters arranged as a cloud-based server system, in accordance with example embodiments.

FIG. 13 depicts a network 1106 of computing clusters 1309a, 1309b, 1309c arranged as a cloud-based server system in accordance with an example embodiment. Computing clusters 1309a, 1309b, 1309c can be cloud-based devices that store program logic and/or data of cloud-based applications and/or services; e.g., perform at least one function of and/or related to a neural network, a conditioned, axial self-attention based neural network, and/or method 2400.

In some embodiments, computing clusters 1309a, 1309b, 1309c can be a single computing device residing in a single computing center. In other embodiments, computing clusters 1309a, 1309b, 1309c can include multiple computing devices in a single computing center, or even multiple computing devices located in multiple computing centers located in diverse geographic locations. For example, FIG. 13 depicts each of computing clusters 1309a, 1309b, and 1309c residing in different physical locations.

In some embodiments, data and services at computing clusters 1309a, 1309b, 1309c can be encoded as computer readable information stored in non-transitory, tangible computer readable media (or computer readable storage media) and accessible by other computing devices. In some embodiments, computing clusters 1309a, 1309b, 1309c can be stored on a single disk drive or other tangible storage media, or can be implemented on multiple disk drives or other tangible storage media located at one or more diverse geographic locations.

FIG. 13 depicts a cloud-based server system in accordance with an example embodiment. In FIG. 13, functionality of a conditioned, axial self-attention based neural network, and/or a computing device can be distributed among computing clusters 1309a, 1309b, 1309c. Computing cluster 1309a can include one or more computing devices 1300a, cluster storage arrays 1310a, and cluster routers 1311a connected by a local cluster network 1312a. Similarly, computing cluster 1309b can include one or more computing devices 1300b, cluster storage arrays 1310b, and cluster routers 1311b connected by a local cluster network 1312b. Likewise, computing cluster 1309c can include one or more computing devices 1300c, cluster storage arrays 1310c, and cluster routers 1311c connected by a local cluster network 1312c.

In some embodiments, each of computing clusters 1309a, 1309b, and 1309c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1309a, for example, computing devices 1300a can be configured to perform various computing tasks of a conditioned, axial self-attention based neural network, and/or a computing device. In one embodiment, the various functionalities of a neural network, and/or a computing device can be distributed among one or more of computing devices 1300a, 1300b, 1300c. Computing devices 1300b and 1300c in respective computing clusters 1309b and 1309c can be configured similarly to computing devices 1300a in computing cluster 1309a. On the other hand, in some embodiments, computing devices 1300a, 1300b, and 1300c can be configured to perform different functions.

In some embodiments, computing tasks and stored data associated with a neural network, and/or a computing device can be distributed across computing devices 1300a, 1300b, and 1300c based at least in part on the processing requirements of a neural network, and/or a computing device, the processing capabilities of computing devices 1300a, 1300b, 1300c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1310a, 1310b, 1310c of computing clusters 1309a, 1309b, 1309c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 1300a, 1300b, 1300c of computing clusters 1309a, 1309b, 1309c, various active portions and/or backup portions of these components can be distributed across cluster storage arrays 1310a, 1310b, 1310c. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1311a, 1311b, 1311c in computing clusters 1309a, 1309b, 1309c can include networking equipment configured to provide internal and external communications for the computing clusters. For example, cluster routers 1311a in computing cluster 1309a can include one or more internet switching and routing devices configured to provide (i) local area network communications between computing devices 1300a and cluster storage arrays 1310a via local cluster network 1312a, and (ii) wide area network communications between computing cluster 1309a and computing clusters 1309b and 1309c via wide area network link 1313a to network 1106. Cluster routers 1311b and 1311c can include network equipment similar to cluster routers 1311a, and cluster routers 1311b and 1311c can perform similar networking functions for computing clusters 1309b and 1309b that cluster routers 1311a perform for computing cluster 1309a.

In some embodiments, the configuration of cluster routers 1311a, 1311b, 1311c can be based at least in part on the data communication requirements of the computing devices and cluster storage arrays, the data communications capabilities of the network equipment in cluster routers 1311a, 1311b, 1311c, the latency and throughput of local cluster networks 1312a, 1312b, 1312c, the latency, throughput, and cost of wide area network links 1313a, 1313b, 1313c, and/or other factors that can contribute to the cost, speed, fault-tolerance, resiliency, efficiency and/or other design criteria of the moderation system architecture.

Example Methods of Operation

FIG. 14 is a flowchart of a method 1400, in accordance with example embodiments. Method 1400 can be executed by a computing device, such as computing device 1200. Method 1400 can begin at block 1410, where the method involves receiving an input image comprising an array of pixels, wherein the input image is associated with a first characteristic.

At block 1420, the method involves applying a neural network to transform the input image associated with the first characteristic to an output image associated with a second characteristic, wherein the applying of the neural network involves generating, by an encoder of the neural network and for each pixel of the array of pixels of the input image, an encoded pixel, providing, to a decoder of the neural network, the array of encoded pixels, applying, by the decoder, axial attention to decode a given pixel, wherein the axial attention comprises a row attention or a column attention applied to one or more previously decoded pixels in rows or columns preceding a row or column associated with the given pixel, and wherein the row or column attention mixes information within a respective row or column, and maintains independence between respective different rows or different columns.

At block 1430, the method involves generating, by the neural network, the output image associated with the second characteristic.

In some embodiments, the neural network includes a plurality of alternating row-wise and column-wise self-attention layers.

In some embodiments, the providing of the array involves providing the array to one or more self-attention layers of an outer decoder of the neural network, and wherein the applying of the axial attention comprises applying, by the outer decoder, one of: row-wise self-attention to the given pixel, wherein the row attention is an unmasked row attention, wherein the column attention is a masked column attention, and wherein the one or more previously decoded pixels are in rows preceding the row associated with the given pixel, or column-wise self-attention to the given pixel, wherein the row attention is a masked row attention, wherein the column attention is an unmasked column attention, and wherein the one or more previously decoded pixels are in columns preceding the column associated with the given pixel.

Some embodiments involve generating, by the outer decoder and conditioned on the array of encoded pixels, an array of decoded pixels. Such embodiments also involve providing, to one or more self-attention layers of an inner decoder of the neural network, the array of decoded pixels, and wherein the applying of the axial attention involves applying, by the inner decoder, one of: row-wise self-attention to the given pixel, wherein the row attention is a masked row attention, and wherein the one or more previously decoded pixels precede the given pixel in the row associated with the given pixel, or column-wise self-attention to the given pixel, wherein the column attention is a masked column attention, and wherein the one or more previously decoded pixels precede the given pixel in the column associated with the given pixel.

Some embodiments involve applying, by the inner decoder and conditioned on the array of encoded pixels and the array of decoded pixels, row-wise self-attention based on one of the masked row attention or the masked column attention.

In some embodiments, the input image associated with the first characteristic may be an image of a first resolution, and wherein the output image associated with the second characteristic may be an image of a second resolution, wherein the second resolution is greater than the first resolution.

In some embodiments, the input image associated with the first characteristic may be a grayscale image, and wherein the output image associated with the second characteristic may be a colorized version of the grayscale image. In some embodiments, the colorization of the grayscale image involves a high-fidelity colorization of the grayscale image.

In some embodiments, the input image comprises a plurality of video frames.

In some embodiments, the generating of the output image involves generating an intermediate output image by applying parallel downsampling to each pixel of the array of pixels, wherein the first intermediate output image comprises one or more of an intermediate color depth, an intermediate color intensity, an intermediate spatial resolution, or an intermediate color resolution. Such embodiments also involve parallel upsampling of each pixel in the intermediate output image to a respective one or more of an output color depth, an output color intensity, an output spatial resolution, or an output color resolution.

Some embodiments involve generating a first intermediate output image comprising an intermediate color depth by applying parallel downsampling to each pixel of the array of pixels. Such embodiments also involve generating a second intermediate output image comprising an intermediate color intensity by applying parallel downsampling to each pixel of the first intermediate output image.

Some embodiments involve parallel upsampling of each pixel in the second intermediate output image, from the intermediate color intensity to a target color intensity. Such embodiments also involve parallel upsampling of each pixel in the upsampled second intermediate output image, from the intermediate color depth to a target color depth.

Some embodiments involve providing the neural network as a pre-processing network for another machine learning model.

In some embodiments, the applying of the axial attention involves applying, to each layer of a decoder, one or more convolutions to generate a plurality of affine transformations. Such embodiments also involve applying the plurality of affine transformations to key, query, and values.

In some embodiments, the neural network includes a two layer, pointwise, feed-forward network after a self-attention layer.

In some embodiments, the applying of the axial attention involves predicting one or more of a global per-channel scale and a global per-channel shift. In such embodiments, one or more of the global per-channel scale or the global per-channel shift may be a learnable parameter.

Some embodiments involve training the neural network to receive a given input image associated with the first characteristic, and apply axial attention to transform the given input image to an output image associated with the second characteristic. In some embodiments, the training of the neural network involves training the neural network based on an object detection network trained to detect one or more objects in the given grayscale image.

In some embodiments, the neural network includes an autoregressive colorizer comprising an encoder configured to apply alternating row and column attention, and an axial transformer configured to apply alternating conditional masked column attention and conditional row attention. In some embodiments, the autoregressive colorizer further comprises one or more layers to apply conditional masked row attention.

Some embodiments involve determining, by the computing device, a request to transform the input image associated with the first characteristic to the output image associated with the second characteristic. Such embodiments also involve sending the request to from the computing device to a second computing device, the second computing device comprising a trained version of the neural network. Such embodiments further involve, after sending the request, the computing device receiving, from the second computing device, the output image.

In some embodiments, the computing device includes a camera, and the method involves accessing the input image using the camera, and receiving, at the computing device, the output image from the camera.

Some embodiments involve providing the output image using the computing device.

In some embodiments, the generating of the output image involves obtaining a trained version of the neural network at the computing device. The applying of the neural network and the generating of the output image may be performed by the computing device using the obtained neural network. In some embodiments, the neural network may be trained at the computing device.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:
   receiving an input grayscale image comprising an array of pixels;
   applying a neural network to transform the input grayscale image to a colorized high resolution version output image, wherein the applying of the neural network comprises:
   generating a low resolution coarse coloring of the input grayscale image, wherein the neural network comprises a plurality of conditional self-attention layers, wherein the generating of the low resolution coarse coloring is performed by one or more self-attention layers of an outer decoder of the neural network, and comprises applying one of:
     row-wise self-attention to a given pixel, wherein a row attention is an unmasked row attention, wherein a column attention is a masked column attention, and wherein one or more previously decoded pixels are in rows preceding a row associated with the given pixel, or
     column-wise self-attention to a given pixel, wherein a row attention is a masked row attention, wherein a column attention is an unmasked column attention, and wherein one or more previously decoded pixels are in columns preceding a column associated with the given pixel, and
   generating, by applying in parallel a color upsampler and a spatial upsampler to the low resolution coarse coloring, the colorized high resolution version output image, wherein each of the color upsampler and the spatial upsampler comprises layers corresponding respectively to the plurality of conditional self-attention layers; and
   providing the generated colorized high resolution version output image.

2. The computer-implemented method of claim 1, wherein the neural network comprises a plurality of alternating row-wise and column-wise self-attention layers.

3. The computer-implemented method of claim 1, further comprising:
   generating, by the outer decoder, an array of decoded pixels; and
   providing, to one or more self-attention layers of an inner decoder of the neural network, the array of decoded pixels; and applying, by the inner decoder, one of:
  row-wise self-attention to the given pixel, wherein the row attention is a masked row attention, and wherein the one or more previously decoded pixels precede the given pixel in the row associated with the given pixel, or
  column-wise self-attention to the given pixel, wherein the column attention is a masked column attention, and wherein the one or more previously decoded pixels precede the given pixel in the column associated with the given pixel.

4. The computer-implemented method of claim 3, further comprising:
  applying, by the inner decoder and based on the array of decoded pixels, row-wise self-attention based on one of the masked row attention or the masked column attention.

5. The computer-implemented method of claim 3, wherein the inner decoder comprises a long short-term memory (LSTM) network.

6. The computer-implemented method of claim 1, wherein the input grayscale image is an image of a first resolution, and wherein the output image is an image of a second resolution, wherein the second resolution is greater than the first resolution.

7. The computer-implemented method of claim 1, wherein the input grayscale image comprises a plurality of video frames.

8. The computer-implemented method of claim 1, wherein the generating of the output image further comprises:
  generating an intermediate output image by applying parallel downsampling, wherein the intermediate output image comprises one or more of an intermediate color depth, an intermediate color intensity, an intermediate spatial resolution, or an intermediate color resolution; and
  parallel upsampling of the intermediate output image to a respective one or more of an output color depth, an output color intensity, an output spatial resolution, or an output color resolution.

9. The computer-implemented method of claim 8, wherein the parallel upsampling comprises predicting a likely color for each pixel.

10. The computer-implemented method of claim 1, wherein the generating of the output image further comprises:
  generating a first intermediate output image comprising an intermediate color depth by applying parallel downsampling; and
  generating a second intermediate output image comprising an intermediate color intensity by applying parallel downsampling to the first intermediate output image.

11. The computer-implemented method of claim 10, further comprising:
  parallel upsampling of the second intermediate output image, from the intermediate color intensity to a target color intensity; and
  parallel upsampling of the upsampled second intermediate output image, from the intermediate color depth to a target color depth.

12. The computer-implemented method of claim 1, further comprising:
  training the neural network to receive a given input grayscale image, and apply axial attention to transform the given input grayscale image to a colorized high resolution version output image.

13. The computer-implemented method of claim 1, wherein the neural network comprises an autoregressive colorizer comprising an encoder configured to apply alternating row and column attention, and an axial transformer configured to apply alternating conditional masked column attention and conditional row attention.

14. The computer-implemented method of claim 13, wherein the autoregressive colorizer further comprises one or more layers to apply conditional masked row attention.

15. The computer-implemented method of claim 1, wherein the generating of the output image further comprises:
  determining, by the computing device, a request to transform the input grayscale image to the colorized high resolution version output image;
  sending the request from the computing device to a second computing device, the second computing device comprising a trained version of the neural network; and
  after sending the request, the computing device receiving, from the second computing device, the output image.

16. The computer-implemented method of claim 1, wherein the computing device comprises a camera, and the method further comprising:
  accessing the input image using the camera; and
  receiving, at the computing device, the output image from the camera.

17. The computer-implemented method of claim 1, wherein the generating of the output image comprises:
  obtaining a trained version of the neural network at the computing device, and
  wherein the applying of the neural network and the generating of the output image are performed by the computing device using the obtained neural network.

18. The computer-implemented method of claim 1, wherein the color upsampler is a self-attention based decoder for color super-resolution.

19. A computing device, comprising:
  one or more processors; and
  data storage, wherein the data storage has stored thereon computer-executable instructions that, when executed by the one or more processors, cause the computing device to carry out functions comprising:
  receiving an input grayscale image comprising an array of pixels;
  applying a neural network to transform the input grayscale image to a colorized high resolution version output image, wherein the applying of the neural network comprises:
    generating a low resolution coarse coloring of the input grayscale image, wherein the neural network comprises a plurality of conditional self-attention layers, wherein the generating of the low resolution coarse coloring is performed by one or more self-attention layers of an outer decoder of the neural network, and comprises applying one of:
      row-wise self-attention to a given pixel, wherein a row attention is an unmasked row attention, wherein a column attention is a masked column attention, and wherein one or more previously decoded pixels are in rows preceding a row associated with the given pixel, or
      column-wise self-attention to a given pixel, wherein a row attention is a masked row attention, wherein a column attention is an unmasked column attention, and wherein one or more previously decoded pixels are in columns preceding a column associated with the given pixel, and generating, by applying in parallel a color upsampler and a spatial upsampler to the low resolution coarse coloring, the colorized high resolution version output image, wherein each of the color upsampler and the spatial upsampler comprises layers corresponding respectively to the plurality of conditional self-attention layers; and providing the generated colorized high resolution version output image.

20. An article of manufacture comprising one or more non-transitory computer readable media having computer-readable instructions stored thereon that, when executed by one or more processors of a computing device, cause the computing device to carry out functions comprising:
receiving an input grayscale image comprising an array of pixels;
applying a neural network to transform the input grayscale image to a colorized high resolution version output image, wherein the applying of the neural network comprises:
generating a low resolution coarse coloring of the input grayscale image, wherein the neural network comprises a plurality of conditional self-attention layers, wherein the generating of the low resolution coarse coloring is performed by one or more self-attention layers of an outer decoder of the neural network, and comprises applying one of:
row-wise self-attention to a given pixel, wherein a row attention is an unmasked row attention, wherein a column attention is a masked column attention, and wherein one or more previously decoded pixels are in rows preceding a row associated with the given pixel, or
column-wise self-attention to a given pixel, wherein a row attention is a masked row attention, wherein a column attention is an unmasked column attention, and wherein one or more previously decoded pixels are in columns preceding a column associated with the given pixel, and generating, by applying in parallel a color upsampler and a spatial upsampler to the low resolution coarse coloring, the colorized high resolution version output image, wherein each of the color upsampler and the spatial upsampler comprises layers corresponding respectively to the plurality of conditional self-attention layers; and providing the generated colorized high resolution version output image.

* * * * *